United States Patent
Kawabe

(10) Patent No.: US 9,003,619 B2
(45) Date of Patent: Apr. 14, 2015

(54) METHOD FOR SPREADING FIBER BUNDLES, SPREAD FIBER SHEET, AND METHOD FOR MANUFACTURING A FIBER-REINFORCED SHEET

(75) Inventor: Kazumasa Kawabe, Fukui (JP)

(73) Assignee: Fukui Prefectural Government, Fukui (JP)

( * ) Notice: Subject to any disclaimer, the term of this patent is extended or adjusted under 35 U.S.C. 154(b) by 721 days.

(21) Appl. No.: 13/322,365

(22) PCT Filed: May 21, 2010

(86) PCT No.: PCT/JP2010/058602
§ 371 (c)(1),
(2), (4) Date: Feb. 13, 2012

(87) PCT Pub. No.: WO2010/137525
PCT Pub. Date: Dec. 2, 2010

(65) Prior Publication Data
US 2012/0135227 A1  May 31, 2012

(30) Foreign Application Priority Data

May 25, 2009  (JP) ................. 2009-124860

(51) Int. Cl.
*D01D 11/02* (2006.01)
*D02J 1/18* (2006.01)
(Continued)

(52) U.S. Cl.
CPC .............. *D01D 11/02* (2013.01); *C08J 5/043* (2013.01); *D02J 1/18* (2013.01); *D04H 3/002* (2013.01); *D04H 3/04* (2013.01); *D04H 3/12* (2013.01); *B29B 15/12* (2013.01)

(58) Field of Classification Search
CPC .................................. D01D 11/02; D02J 1/18
USPC ........... 28/282, 283, 220, 271; 19/66 T, 66 R; 226/97.4; 264/285, 294, 112; 156/123, 156/178
See application file for complete search history.

(56) References Cited

U.S. PATENT DOCUMENTS 3,535,745 A * 10/1970 Zeidman .......................... 28/283
5,446,952 A *  9/1995 Kim et al. ....................... 28/283
(Continued)

FOREIGN PATENT DOCUMENTS

EP    0837162 A1   4/1998
JP    3064019 B2   7/2000
(Continued)

OTHER PUBLICATIONS

European Search Report corresponding to European Patent Application No. 10780480.95, dated Oct. 31, 2012.

Primary Examiner — Amy Vanatta
(74) Attorney, Agent, or Firm — Sughrue Mion, PLLC

(57) ABSTRACT

The present invention has an object to provide a fiber-spreading method which can form a thin spread fiber sheet having a large and uniform spread width by uniformly distributing fibers of a fiber bundle having an increased number of fibers. Since a set of regions $S_i$ each including a pair of a fiber-spreading region $A_i$ and an expansion region $B_i$ are arranged in a movable region M set so that the fibers of the fiber bundle can move in the width direction, the fiber-spreading region $A_i$ moving the fibers in the width direction while bending the fibers by letting a fluid pass through the fiber bundle, thereby spreading the fiber bundle to a spread width $W_i$ (i=1, ..., n), and the expansion region $B_i$ which is set on the upstream side in the feeding direction corresponding to the fiber-spreading region $A_i$ and in which the width of the fiber bundle expands toward the end with movement of the fibers in the width direction in the fiber-spreading region $A_i$, by performing pre-spreading in which a movement phenomenon in the width direction caused by distribution of the fibers of the fiber bundle occurring in the fiber-spreading region $A_i$ is made to act on the expansion region $B_i$ on the upstream side, the fibers can be uniformly distributed in the fiber-spreading region $A_i$ and the spread width can be expanded to a predetermined width so as to make the thickness uniform.

18 Claims, 9 Drawing Sheets

(51) Int. Cl.
*C08J 5/04* (2006.01)
*D04H 3/002* (2012.01)
*D04H 3/04* (2012.01)
*D04H 3/12* (2006.01)
*B29B 15/12* (2006.01)

(56) References Cited

U.S. PATENT DOCUMENTS

| | | | |
|---|---|---|---|
| 6,032,342 A * | 3/2000 | Kawabe et al. | 28/283 |
| 6,094,791 A * | 8/2000 | Akase et al. | 28/282 |
| 6,743,392 B2 * | 6/2004 | Tanaka et al. | 264/444 |
| 6,836,939 B2 * | 1/2005 | Guirman et al. | 28/283 |
| 2006/0137156 A1 * | 6/2006 | Kawabe et al. | 28/271 |
| 2009/0271960 A1 * | 11/2009 | Kawabe et al. | 28/283 |

FOREIGN PATENT DOCUMENTS

| | | |
|---|---|---|
| JP | 2002-115143 A | 4/2002 |
| JP | 2003213537 A | 7/2003 |
| JP | 2003-336135 A | 11/2003 |
| JP | 2004-100882 A | 4/2004 |
| JP | 2007-518890 A | 7/2007 |
| WO | 2005002819 A2 | 1/2005 |
| WO | 2008062818 A1 | 5/2008 |

* cited by examiner

METHOD FOR SPREADING FIBER BUNDLES, SPREAD FIBER SHEET, AND METHOD FOR MANUFACTURING A FIBER-REINFORCED SHEET

TECHNICAL FIELD

The present invention relates to a method for spreading fiber bundles by feeding a fiber bundle made of a large number of fibers in a fiber length direction and moving the fibers in a width direction while bending the fibers by letting a fluid pass through the fiber bundle, thereby spreading the fiber bundle, and relates to a spread fiber sheet obtained by spreading the fiber bundles, and a method for manufacturing a fiber-reinforced sheet in which a resin material is caused to adhere to or to impregnate the spread fiber sheet.

BACKGROUND ART

A fiber-reinforced composite material in which reinforced fibers such as a carbon fiber, a glass fiber, and an aramid fiber and a matrix resin such as an epoxy resin are combined has been developed, and regarding such reinforced fibers, by laminating thin spread fiber sheets aligned in one direction in multiple directions for use, reliable composite material moldings with high strength can be obtained. Also, in view of advantages of recyclability, short time moldability, improvement in impact resistance of the moldings and the like, use of a composite material molding using a thermoplastic resin such as polyamide 6 resin, polyether imide resin, polyetheretherketone resin and the like for the matrix resin is expected to increase.

Recently, a carbon fiber composite material has drawn a marked attention as materials for aircrafts and vehicles. There are various carbon fibers, and major carbon fibers include a carbon fiber called a general-purpose carbon fiber of a type having a tensile modulus of approximately 24 ton/mm$^2$ and a single-fiber diameter of approximately 7 μm used for industrial applications and sport applications and a carbon fiber called high-strength and moderate-elasticity carbon fiber having a tensile modulus of approximately 30 ton/mm$^2$ and a single-fiber diameter of approximately 5 μm used for aircraft application.

A plurality of the carbon fibers is bundled and sold as a carbon fiber bundle, and the number of fibers is also varied. From the viewpoint of price, quality of the product (straightness of the fiber, aligned state of the fibers and the like), and ease of handling, those with the number of fibers of 12000 and 15000 (fineness of approximately 800 to 1100 g/1000 m) are mainly used for the general-purpose carbon fiber bundle and those with the number of fibers of 12000 and 24000 (fineness of approximately 400 to 1000 g/1000 m) for the high-strength and moderate-elasticity carbon fiber bundle.

The general-purpose carbon fiber bundles include a type in which the number of fibers is increased in order to reduce the price, and those with the number of fibers of 24000 (fineness of approximately 1600 g/1000 m) and 48000 (fineness of approximately 3200 g/1000 m) or more are sold in the market. Since these fiber bundles have large fineness, they are also called large-fineness carbon fiber bundles. However, the carbon fiber bundle having an increased number of fibers has a defect that the larger the number of fibers becomes, the more meandering and tangling of fibers occur.

For development of a thin sheet and improvement of impregnating performance of a highly viscous resin such as a thermoplastic resin, a spreading process of making the fiber bundle wide and thin is needed. Particularly, the spreading process is important for a fiber bundle having an increased number of fibers. As a spreading technology, Patent Document 1, for example, discloses a manufacturing method of a multifilament spread sheet in which an airflow is made to pass several times in a direction crossing the multifilament while the multifilament is fed from a fiber feeding portion to a take-up portion so as to bend the multifilament in an arc shape in the leeward direction so that filaments forming the multifilament is unwound and spread in the width direction. Also, in Patent Document 2, a spreading device is described which includes a feeding-out roll around which a fiber assembly is wound, a spread portion which spreads the fiber assembly fed out of this feeding-out roll by causing a fluid to flow in a direction orthogonal to the moving direction of the fiber assembly, and a take-up roll which takes-up a spread sheet having been spread in the spread portion, and in which spread portions are disposed in plural stages in the moving direction. Also, in Patent Document 3, a spreading device is described in which a fiber bundle is pulled out of each of a plurality of fiber feeding bodies and supplied and the supplied fiber bundle is made to run through an air flow in a plurality of fluid flowing portions so that the fiber bundle is spread in the width direction while being bent by the action of the airflow.

CITATION LIST

Patent Document

Patent Document 1: Japanese Patent No. 3064019
Patent Document 2: Japanese Patent No. 3907660
Patent Document 3: Japanese Unexamined Patent Application Publication (Translation of PCT application) No. 2007-518890

SUMMARY OF INVENTION

Technical Problem

In the above-described Patent Documents, the spread technologies in which the fiber bundle is expanded to a predetermined width by letting a fluid pass through the fiber bundle being fed are described. In such spread technologies, it is necessary to spread the spread width as much as possible while uniformly distributing fibers constituting the fiber bundle and to form the thickness of the spread fiber bundle uniformly thin as much as possible.

Also, the fiber bundle having an increased number of fibers, that is, the large-fineness fiber bundle has a material cost lower than that of a fiber bundle having a smaller number of fibers, that is, a thin fineness fiber bundle, and thus spread using the large-fineness fiber bundles can reduce a manufacturing cost. Moreover, the spread using the large-fineness fiber bundle can obtain a wider spread fiber sheet by one spread process, and thus, production efficiency can be markedly improved.

In Patent Document 1, in order to spread the spread width of the fiber bundle, a spreading action is applied to the fiber bundle several times (twice in the embodiment), but a front feeder and a back feeder as well as a facility for adjusting a degree by which fibers are bent such as a bend measuring sensor need to be installed at plural spots (two spots in the embodiment), and a size increase of the device cannot be avoided, and a facility cost burden becomes large. Moreover, it is difficult to arrange the facilities in the width direction, and it is difficult to obtain a good-quality spread fiber sheet in which a plurality of fiber bundles is spread at the same time.

In Patent Documents 2 and 3, the spread portions are consecutively provided in plural stages so that the spread width is consecutively expanded each time the fiber bundle passes through each spread portion. If the spread width is expanded by consecutively passing through the spread portions, fibers constituting the fiber bundle are not uniformly distributed but the density of the spread fibers is varied and even a gap is generated depending on the case.

As the result of experiments by the inventor by referring to the embodiments of Patent Documents 2 and 3, when the general-purpose carbon fiber bundles having the number of fibers of 12000 and 15000 or the high-strength and moderate-elasticity carbon fiber bundles having the number of fibers of 12000 and 24000 was used, the carbon fiber was distributed substantially uniformly up to the spread width of a single carbon fiber bundle of approximately 20 to 25 mm (weight was approximately 40 g/m$^2$) and a spread fiber sheet having a uniform thickness can be continuously formed, but when wide spread to the spread width of 25 mm or more (weight was approximately 30 g/m$^2$ or less) was continuously performed, portions with splits occurred in the spread fiber sheet.

Also, when the large-fineness carbon fiber bundle having the number of fibers of 24000 was used, the carbon fiber was distributed substantially uniformly up to the spread width of a single carbon fiber bundle of approximately 30 to 35 mm (weight was approximately 50 g/m$^2$) and a spread fiber sheet having a uniform thickness was able to be continuously formed, but when wide spread to the spread width of approximately 40 mm or more (weight was approximately 40 g/m$^2$ or less) was continuously performed, portions with splits, bundles caused by entangling of fibers, partial twist and the like occurred in the spread fiber sheet.

Moreover, when fiber spreading was performed so as to have a spread width of a single carbon fiber bundle of approximately 40 mm or more by using the large-fineness carbon fiber bundle having the number of fibers of 48000 or 60000, bundle by fiber entanglement or partial twist occurred, and it was confirmed that continuous spread is difficult.

The causes of such non-uniform distribution of fibers in the spread process were examined and the following causes are found. With the methods of Patent Documents 2 and 3, since the portions where the airflow is made to act on the fibers in the bent state are continuous, if the number of continuity of the spread portions is to be increased or the airflow velocity is to be increased in order to perform wider spread, each fiber can move easily in the width direction and is continuously subjected to a force to expand in the width direction. The fiber bundles are not necessarily aligned in the straight state but are entangled to some degree, and adhesion of a sizing agent which bundles fibers becomes uneven. Thus, if the fiber bundle is to be continuously spread wider and thinner with the methods of Patent Documents 2 and 3, the force to expand in the width direction partially acts to the fibers more than necessary, and as a result, the fibers move in the width direction in a collected state or entanglement of the fibers is increased so as to deteriorate distribution of the fibers or moreover, the fibers move in the width direction from a spot where an adhesion amount of the sizing agent is small, whereby portions with unstable gaps and spread width are generated in the spread state of the fiber bundles. That is, it was found out that it becomes difficult to continuously spread the fibers constituting the fiber bundle in a uniformly distributed state.

In the fiber bundle having an increased number of fibers (large-fineness fiber bundle), uneven adhesion of the sizing agent and entanglement of fibers can occur more easily. Thus, if the large-fineness fiber bundle is spread with the methods of Patent Documents 2 and 3, the unstable gap and spread width in the spread fiber sheet can occur more easily.

Therefore, in the prior-art spread technologies, wider spread (spread with the spread width of a single carbon fiber bundle of 25 mm or more in the case of the general-purpose carbon fiber bundle with the number of fibers of 12000 and 15000 and the high-strength and moderate-elasticity carbon fiber bundle having the number of fibers of 12000 and 24000) and wide spread excellent in fiber distribution of the large-fineness fiber bundles (spread with the spread width of a single carbon fiber bundle of 40 mm or more in the case of the large-fineness carbon fiber bundle having the number of fibers of 24000 or more) have been difficult.

Therefore, the present invention has an object to provide a method for spreading which can be also applied to a fiber bundle having an increased number of fibers and can continuously form a thin spread fiber sheet having a wide spread width and a uniform thickness by uniformly distributing the fibers, a spread fiber sheet using a carbon fiber bundle, and a method for manufacturing a fiber-reinforced sheet in which a resin material is caused to adhere to or to impregnate the spread fiber sheet obtained by this spread method and which has excellent dynamic characteristics.

Solution to the Programs

A method for spreading fiber bundles according to the present invention is a method for spreading fiber bundles, comprising the steps of feeding a fiber bundle formed of a large number of fibers in a fiber length direction and moving the fibers in a width direction while bending the fibers by letting a fluid pass through the fiber bundle in a movable region set so that the fibers can move in the width direction, thereby spreading the fiber bundle, wherein in the movable region, a set of regions $S_i$ (i=1, . . . , n) each including a pair of a fiber-spreading region $A_i$ (i=1, . . . , n) and an expansion region $B_i$ (i=1, . . . , n) are arranged in a feeding direction of the fiber bundle in a number of n (n≥2), the fiber-spreading region $A_i$ moving the fibers in the width direction while bending the fibers by letting a fluid pass through the fiber bundle, thereby spreading the fiber bundle to a spread width $W_i$ (i=1, . . . , n), and the expansion region $B_i$ which is set on the upstream side in the feeding direction corresponding to the fiber-spreading region $A_i$ and in which the width of the fiber bundle expands toward the end with movement of the fibers in the width direction in the fiber-spreading region $A_i$; and the fiber bundle is spread by being fed so as to sequentially pass through the region set $S_i$. Moreover, in the first region set $S_1$, the spread width $W_1$ of the fiber bundle in the fiber-spreading region $A_1$ is set to satisfy with respect to an original width $W_0$ of the fiber bundle:

$1<(W_1/W_0)\leq5$; and in the remaining region sets $S_j$ (j=2, . . . , n), a spread width $W_{j-1}$ of the fiber-spreading region $A_{j-1}$, a spread width $W_j$ of the fiber-spreading region $A_j$, and a length $L_j$ of the fiber bundle in the feeding direction in the expansion region $B_j$ are set to satisfy:

$0<(W_j-W_{j-1})/2L_j\geq\tan 30°$.

Moreover, the spread width $W_1$ of the fiber bundle in the fiber-spreading region $A_1$ is set to satisfy:

$2\leq(W_1/W_0)\geq4$.

Moreover, it is characterized in that at least in a part of the fiber-spreading regions, a fluid is passed through the fiber bundles in a plurality of sections so that the fibers are moved in the width direction while being bent. Moreover, it is characterized in that at least in a part of the expansion regions, at least one or more contact rolls arranged in the width direction and in contact with the fiber bundle is disposed, and the fiber bundle is fed in contact with the contact roll. Moreover, it is characterized in that the contact roll reciprocates in the width direction of the fiber bundle. Moreover, it is characterized in that at least in a part of the expansion regions and/or the fiber-spreading regions, the fiber bundle is heated. Moreover, it is characterized in that at least in apart of the fiber-spreading regions, a degree by which the fiber bundle is bent is temporally changed. Moreover, it is characterized in that at least in a part of the fiber-spreading regions, spread is performed while a predetermined degree by which the fiber bundle is bent is ensured by a bend ensuring roll for the fiber bundle. Moreover, it is characterized in that by means of at least one roll in the bend ensuring rolls, the fiber bundle is vibrated in a direction orthogonal to the feeding direction. Moreover, it is characterized in that on the upstream side of the movable region, the fiber bundle is fed while pullback of the fiber bundle is prevented. Moreover, it is characterized in that vibration is given in the width direction to the spread fiber sheet obtained by spreading the fiber bundle. Moreover, it is characterized in that a plurality of the fiber bundles is spread at the same time while being fed. Moreover, it is characterized in that vibration in the width direction is given to the plurality of spread fiber sheet obtained by spreading a plurality of the fiber bundles arranged in parallel so as to form an entirely uniform sheet state.

The spread fiber sheet according to the present invention is characterized in that the carbon fiber bundle having the number of fibers in the range of 12000 to 24000 and the fineness in the range of 400 g/1000 m to 1100 g/1000 m is spread so as to have the carbon fiber bundle having the width of 25 mm or more and the thickness of 0.04 mm or less. Moreover, it is characterized in that the carbon fiber bundle having the number of fibers of 24000 or more and the fineness of 1600 g/1000 m or more is spread so as to have the carbon fiber bundle having the width of 40 mm or more and the thickness of 0.2 mm or less.

The method for manufacturing a fiber-reinforced sheet according to the present invention is characterized in that a resin layer is formed on one side or both sides of the spread fiber sheet obtained by any of the methods for spreading fiber bundles so as to form the fiber-reinforced sheet. Moreover, it is characterized in that the resin layer is formed by using a resin sheet. Moreover, it is characterized in that the fiber-reinforced sheet is manufactured by causing the spread fiber sheet obtained by any of the methods for spreading fiber bundles to adhere to both faces of the resin sheet. Moreover, it is characterized in that the fiber-reinforced sheet is manufactured by impregnating the spread fiber sheet obtained by any of the methods for spreading fiber bundles with a resin material.

Advantages of the Invention

The present invention is provided with the above configuration so that a set of regions $S_i$ each including a pair of a fiber-spreading region $A_i$ (i=1, ..., n) and an expansion region $B_i$ (i=1, ..., n) are arranged in a movable region M set so that the fibers of the fiber bundle can move in the width direction, the fiber-spreading region $A_i$ moving the fibers in the width direction while bending the fibers by letting a fluid pass through the fiber bundle, thereby spreading the fiber bundle to a spread width $W_i$ (i=1, ..., n), and the expansion region $B_i$ which is set on the upstream side in the feeding direction corresponding to the fiber-spreading region $A_i$ and in which the width of the fiber bundle expands toward the end with movement of the fibers in the width direction in the fiber-spreading region $A_i$, by performing pre-spreading in which a movement phenomenon in the width direction caused by distribution of the fibers of the fiber bundle occurring in the fiber-spreading region $A_i$ is made to act on the expansion region $B_i$ on the upstream side so as to gradually move the fibers in the width direction, an action of uniformly distributing the fibers in the fiber-spreading region $A_i$ and of expanding the spread width to a predetermined width can be continuously performed, and the fiber bundle can be spread wide in a state of favorable fiber distribution.

As in the above-described prior-art documents, if wide fiber-spreading is performed by a method in which fiber-spreading regions are continuously set, spreading is continued in a state affected by uneven adhesion or entanglement of the fibers, and the uneven adhesion or entanglement of the fibers have prevented uniform distribution of the fibers, but in the present invention, since a plurality of the region sets $S_i$ in which the expansion region $B_i$ is set on the upstream side of the fiber spreading region $A_i$ is arranged, fiber-spreading will be able to be gradually performed while the fiber bundle is untangled.

That is, in the movable region, since movement of the fibers in the width direction by being sandwiched by a feed roller or the like is not obstructed, the fibers of the fiber bundle can move in the width direction in this region. By arranging a plurality of pairs of the expansion region $B_i$ and the fiber-spreading region $A_i$ in this region, even if there is uneven adhesion of the sizing agent or entanglement of the fibers in the fiber bundle, fiber-spreading can proceed such that the fibers gradually move in the width direction and the fiber bundle is untangled. That is, in the movable region, the fiber bundle can sequentially expand the spread width while being uniformly distributed in a state with excellent straightness without meandering of the fibers.

By spreading fiber after the above region setting, even in the case of using the carbon fiber bundle having the number of fibers of 12000 to 24000, the carbon fibers, each having the spread width of a single carbon fiber bundle of 25 mm or more (weight is approximately 30 g/m² or less), are uniformly distributed, and a thin spread fiber sheet having a uniform thickness can be formed. Also, even if the large-fineness carbon fiber bundle having the number of fibers of 24000 or more is used, by increasing the number of arranged region sets $S_i$, stable fiber-spreading to a thin spread fiber sheet having a wide spread width and an uniform thickness is realized. That is, even if wide fiber-spreading in which the fiber bundle width becomes 4 to 5 times of that before the fiber-spreading, without being affected by the uneven adhesion of the sizing agent or entanglement of the fiber, the fibers gradually move in the width direction, and the fiber-spreading with excellent fiber distribution can be performed, and the width and fiber distribution in the spread state are much more continuous than the prior-art fiber-spreading methods and stable.

In the first region set $S_1$, by setting the spread width $W_1$ of the fiber bundle in the fiber-spreading region $A_i$ with respect to the original width $W_0$ of the fiber bundle to:

$$1 < (W_1/W_0) \leq 5$$

when the fiber bundle is first expanded, fiber-spreading can be performed without causing a split in the fiber bundle while twists generated when the fiber bundle is released from a bobbin or partial twists inside the fiber bundle considered to be caused in a process of manufacturing the fiber bundle are untangled.

Also, in the remaining region sets $S_j$ (j=2, ..., n), by setting the spread width of the fiber-spreading region $A_{j-1}$, the spread width $W_j$ of the fiber-spreading region $A_j$, and the length $L_j$ in the feeding direction of the fiber bundle in the expansion region $B_j$ so that they satisfy the following:

$$0 < (W_j - W_{j-1})/2L_j \leq \tan 30°,$$

the uneven adhesion of the sizing agent partially generated in the fiber bundle and the entanglement of the fibers are gradually untangled in the pre-spreading in the expansion region $B_j$, and fiber-spreading can be performed in the fiber-spreading region $A_j$ without causing uneven density in the fibers but with uniformly distributed fibers.

By associating the spread width $W_j$ of the fiber-spreading region $A_j$ as indicated in the above-described equation on the basis of the length $L_j$ in the feeding direction of the expansion region $B_j$, the spread width $W_j$ of the fiber-spreading region $A_j$ is set so as not to expand too much with respect to the length $L_j$ in the feeding direction of the expansion region $B_j$, and occurrence of splits and the like in the fiber bundle can be prevented.

The spread fiber sheet obtained by this fiber-spreading method is a spread fiber sheet excellent in the fiber straightness and fiber distribution and having a smaller number of fibers in the thickness direction, is easily impregnated with a matrix material such as a resin and can fully exert dynamic characteristics (tensile characteristics) unique to the fibers.

Also, by means of the manufacturing method in which a resin material is made to adhere to or to impregnate the spread fiber sheet excellent in the fiber straightness and fiber distribution obtained by this fiber-spreading method, the dynamic characteristics (tensile characteristics, compression characteristics and the like) unique to the fibers can be fully exerted, and a fiber-reinforced sheet homogenized in the width direction and in the thickness direction with fewer defects causing stress concentration can be obtained.

By means of the manufacturing method in which a resin material is made to adhere to or to impregnate the spread fiber sheet having a smaller number of fibers in the thickness direction, that is, the thin spread fiber sheet obtained by this fiber-spreading method, a fiber-reinforced sheet excellent in moldability, that is, draping performance can be obtained.

BEST MODES FOR CARRYING OUT THE INVENTION

Embodiments according to the present invention will be described below in detail. The embodiments described below are preferred embodiments in implementing the present invention and have various technical limitations, but the present invention is not limited by these modes unless particularly provided otherwise in the following description.

Figure 1:
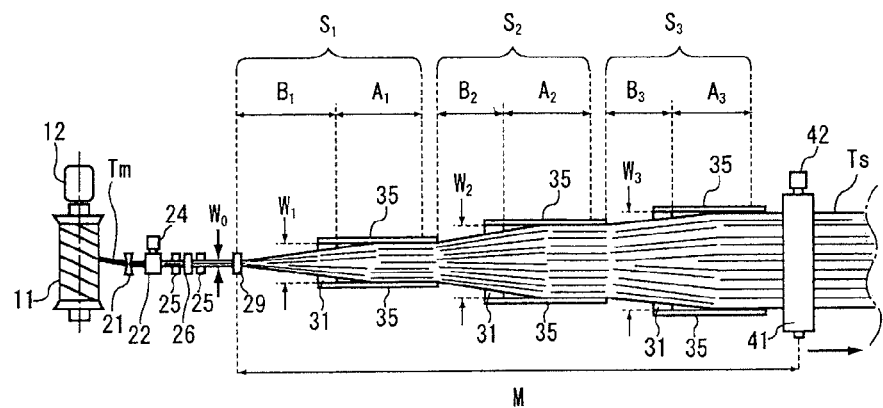
FIG. 1 is a schematic plan view relating to a device example in which a fiber-spreading method according to the present invention is implemented.
Figure 2:
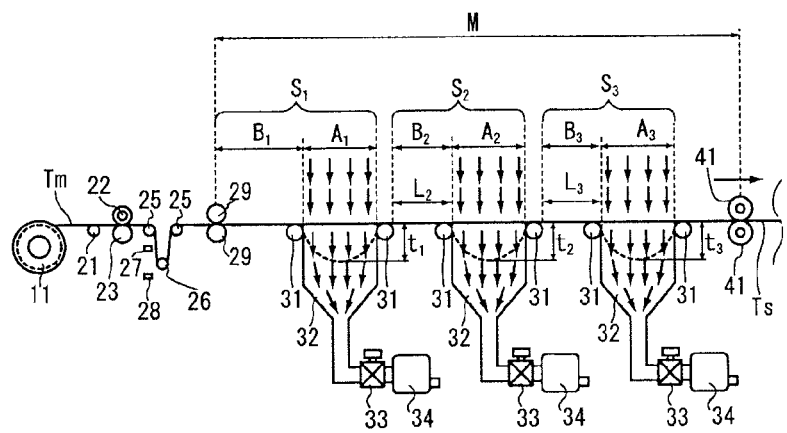
FIG. 2 is a schematic side view relating to the device example shown in FIG. 1.

FIGS. 1 and 2 are a schematic plan view and a schematic side view relating to a device example in which the fiber-spreading method according to the present invention is implemented. A fiber bundle Tm obtained by bundling a plurality of filaments is wound around a bobbin-type yarn supplier 11, and by rotating the yarn supplier 11 by a yarn supply motor 12, the fiber bundle Tm is unwound.

As a fiber material used for the fiber bundle Tm, a reinforced fiber bundle made of a high-strength fiber such as a carbon fiber bundle, a glass fiber bundle, an aramid fiber bundle, and a ceramic fiber bundle, a thermoplastic resin fiber bundle in which thermoplastic synthetic fibers such as polyethylene, polypropylene, nylon 6, nylon 66, nylon 12, polyethylene terephthalate, polyphenylene sulfide, and polyetheretherketon are aligned can be cited. In the case of the carbon fiber bundle, those with the number of fibers of 12000 to 24000 are distributed in the market in many cases but in the present invention, a fiber bundle having the number of fibers exceeding 24000 (48000 or 60000, for example) can be also used.

Also, as a mode of the fiber bundle Tm, a state in which a plurality of fibers is aligned bundled so that they do not become loose by a sizing agent or the like is preferable. Even in a spread fiber sheet spread by adhesion of the sizing agent, the mode is stabilized. With a fiber bundle in a mode in which the fibers are forcedly twisted to be given twist, a continuously spread state is difficult to obtain, and use thereof in the fiber-spreading method of the present invention is not preferable.

The fiber bundle Tm unwound from the yarn supplier 11 is pulled out in a predetermined pulling-out direction by a guide roll 21 rotatably supported at a predetermined position. The pulled-out fiber bundle Tm is sandwiched by a feed roll 22 and a support roll 23 and supplied by a predetermined supplying amount. The supplying amount of the fiber bundle Tm is adjusted by controlling a rotation operation of a feed motor 24 which rotates the feed roll 22.

The fiber bundle Tm having been supplied by the feed roll 22 is supported by a pair of support rolls 25 arranged with a predetermined interval in the feeding direction of the fiber bundle Tm and fed. Between the support rolls 25, a tension-giving roll 26 is provided capable of elevation, and the fiber bundle Tm is set so as to go around the lower side of the tension-giving roll 26 from the upper side of the support rolls 25. The fiber bundle Tm passing between the support rolls is given a tension in a predetermined range by the tension-giving roll 26. Then, the tension-giving roll 26 is elevated up and down by the supplying amount of the fiber bundle Tm supplied by the feed roll 22. The elevation operation of the tension-giving roll 26 is detected by an upper-limit position detection sensor 27 and a lower-limit position detection sensor 28.

The tension-giving roll 26 operates so as to raise if the supplying amount of the fiber bundle Tm decreases with respect to the amount which the fiber bundle Tm is spread and fed (feeding amount) and to lower if the supplying amount increases with respect to the feeding amount of the fiber bundle Tm. Thus, if the tension-giving roll 26 raises and the upper-limit position detection sensor 27 detects the tension-giving roll 26, rotation of the feed roll 22 is quickened so as to increase the supplying amount of the fiber bundle Tm. Also, if the tension-giving roll 26 lowers and the lower-limit position detection sensor 28 detects the tension-giving roll 26, the rotation of the feed roll 22 is slowed so as to decrease the supplying amount of the fiber bundle Tm.

As described above, the supplying amount of the fiber bundle Tm is adjusted so that the tension-giving roll 26 is located in a predetermined range on the basis of detection signals from the upper-limit position detection sensor 27 and the lower-limit position detection sensor 28 and the tension of the fiber bundle Tm is stabilized in the predetermined range.

Any mechanism can be used other than this mechanism as long as the fiber bundle is pulled out of the bobbin and the tension of the fiber bundle is continuously stabilized in a certain range.

Nip rolls 29 are provided on the downstream side of the support roll 25, and the fiber bundle Tm is sandwiched by the nip rolls 29 and fed to the spread portion. The nip roll 29 is attached with one-way clutch, not shown, so that it rotates only in the direction for feeding out the fiber bundle Tm and does not rotate in the direction to pull back the fiber bundle Tm.

The fiber bundle Tm having passed between the nip rolls 29 and set to a tension in a predetermined range passes through a plurality of spread portions arranged in the feeding direction. Each spread portion supports the fiber bundle Tm by a pair of guide rolls 31 arranged in the feeding direction. A cavity tube 32 is provided between the guide rolls 31, and an upper opening portion of the cavity tube 32 is formed having a predetermined width between the guide rolls 31. A flow control valve 33 and an air intake pump 34 are mounted on the lower side of the cavity tube 32, and by operating the air intake pump 34 so as to suction air in the cavity tube 32, airflow is generated by suctioning in the upper opening portion between the guide rolls 31.

If the suctioned airflow passes through the fiber bundle Tm being fed between the guide rolls 31, due to the relation between the tension of the fiber bundle Tm and the flow velocity of the air flow, the fiber bundle Tm is brought into a bent state. In such a state, when the airflow passes through the fibers of the fiber bundle Tm, a force to move the fibers in the width direction of the fiber bundle Tm acts, and due to the effect of the degree by which the fibers are bent, the fiber bundle Tm is spread. Such a spreading action is known.

If the fiber bundle Tm is bent, the degree by which the fiber bundle Tm is bent can be expressed by a bend amount t. The bend amount t can be expressed by a distance from the upper face of the guide roll 31 to the lowermost position when the fiber bundle is bent.

By providing the nip rolls 29, the fiber bundle Tm is not pulled back in the direction opposite to the feeding direction but is in a state in which the fiber bundle Tm can be easily bent in the cavity tube.

A pair of guide members 35 are mounted in the feeding direction on the both sides of the upper opening portion of the cavity tube 32 so that the spread width is regulated by the guide members 35 when fiber spreading is performed by passage of the suction airflow through the fiber bundle Tm being fed between the guide rolls 31.

As the guide members 35, the upper opening portions of the cavity tube 32 may be formed into a rectangular shape so that the side walls of the opening portion can be used as they are. Alternatively, a plurality of wires or the like is provided upright in the cavity tube 32 to be used as the guide members.

The fiber bundle Tm is spread by the spread portions several times, and a thin spread fiber sheet Ts in which the fibers are uniformly distributed is formed. The spread fiber sheet Ts is sandwiched by a take-up roll 41 and fed. The take-up roll 41 is rotated and driven by a take-up motor 42 and takes in and feeds the spread fiber sheet Ts. Thus, the feeding speed of the fiber bundle Tm can be adjusted by the rotation speed of the take-up motor 42.

The spread fiber sheet Ts fed out by the take-up roll 41 is taken up by a taking-up device, not shown. Alternatively, the spread fiber sheet Ts is continuously fed to a device for letting the resin material adhere to or impregnate and the like.

In the above device, the fiber bundle Tm is sandwiched by the nip rolls 29, and the spread fiber sheet Ts is sandwiched by the take-up roll 41, and the fiber bundle Tm is not sandwiched between these roller pairs. Thus, a space between the two roller pairs is a movable region M where the fibers of the fiber bundle Tm is fed in a state movable in the width direction.

The fiber bundle Tm is fed by the take-up roll 41 at a predetermined feeding speed while its tension is adjusted by the tension-giving roll 26 to fall within the predetermined range. And thus, the fiber bundle Tm is fed in a state bent by the suction airflow in the plurality of spread portions arranged in the movable region M.

A space between the guide rolls 31 of the spread portion is set to respective fiber-spreading regions $A_1$ to $A_3$. The spread widths $W_1$ to $W_3$ of each of the fiber-spreading regions are set by the interval between the pair of guide members of each spread portion. The width before the fiber bundle Tm enters the movable region M is an original width $W_0$.

The upstream side of each of the fiber-spreading regions is set to expansion regions $B_1$ to $B_3$ where the fiber bundle Tm expands toward the end. In the example illustrated in FIGS. 1 and 2, the expansion region $B_1$ is set from the nip rolls 29 to the guide rolls on the upstream side of the fiber-spreading region $A_1$, and the expansion regions $B_2$ to $B_3$ are set between the downstream-side end portions of the guide members 35 to the guide rolls on the upstream side of the fiber-spreading region. The lengths $L_2$ and $L_3$ of the fiber bundle Tm in the feeding direction in the expansion region set on the upstream side of each fiber-spreading region are the lengths of the regions where the fiber bundle Tm actually expands toward the end and the length from the downstream-side end portions of the guide members 35, which is the start position, to the guide rolls on the upstream side of the fiber-spreading region. In the example illustrated in FIG. 1, an interval is generated between the expansion region and the fiber-spreading region on the upstream side of the expansion region due to the set position of the guide members 35, but it can be set such that the fiber-spreading region continues to the expansion region by adjusting the set positions of the guide members.

The upstream sides of respective fiber-spreading regions are set to the expansion regions $B_1$ to $B_3$ where the fiber bundle Tm expands toward the end. The lengths $L_2$ and $L_3$ of the fiber bundle Tm in the feeding direction in the expansion regions between the fiber-spreading regions are set as intervals between the guide rolls of the adjacent fiber-spreading regions. The expansion region $B_1$ is set from the nip rolls 29 to the fiber-spreading region $A_1$.

The region sets $S_1$ to $S_3$, each having the pair of the fiber-spreading region and the expansion region, are arranged in the feeding direction of the fiber bundle Tm in the movable region M.

Figure 3:
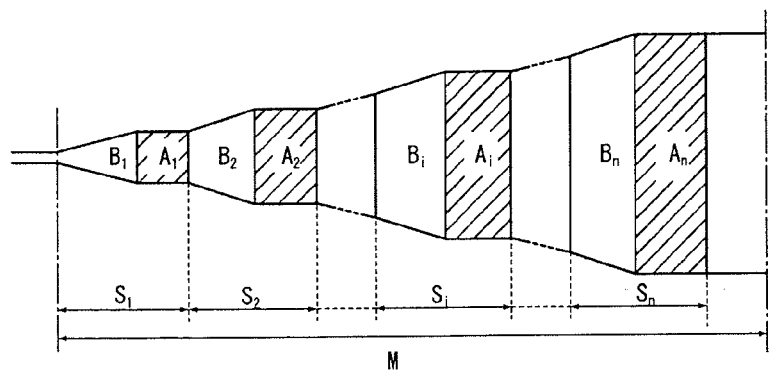
FIG. 3 is a schematic diagram illustrating arrangement of a plurality of region sets $S_i$ (i=1, ..., n) in a movable region M in a generalized manner.

FIG. 3 is a schematic diagram illustrating the arrangement of the plurality of region sets $S_i$ (i=1, ..., n) in such movable region M in a generalized manner. In FIG. 3, the region sets are continuously arranged, but they may be arranged so that intervals are provided between each region set as illustrated in FIGS. 1 and 2. The region set $S_i$ is provided with the fiber-spreading region $A_i$ in which the fibers are moved in the width direction so as to spread the fibers to the spread width $W_i$ while the fibers are bent by letting the suction airflow pass as a fluid through the fiber bundle and the expansion region $B_i$ set on the upstream side in the feeding direction with respect to the fiber-spread region $A_i$ and in which the width of the fiber bundle extends toward the end with the movement of the fibers of the fiber-spreading region $A_i$ in the width direction.

In the present invention, in order to make the phenomenon in which the fibers of the fiber bundle move in the width direction generated in the fiber-spreading region $A_i$ act on the expansion region $B_i$ on the upstream side and to expand the fibers toward the end, fiber-spreading is performed so that the uneven adhesion of the sizing agent and entanglement of the fibers are gradually solved and the fibers are untangled. That is, fibers can be spread while the influences of the uneven adhesion of the sizing agent and the entanglement of the fibers are suppressed. Whether the arrangement of each region set continues or there is an interval between the region sets, the each fiber in the movable region can move in the width direction, and thus, the fiber bundles can be spread so that each fiber is untangled.

Since in the fiber-spreading region $A_i$, the fibers are spread to a predetermined spread width and the spread width is extended as the fiber bundle is fed to the downstream, the thickness of the spread fiber bundle gradually decreases. If the fiber bundle is thick, the uneven adhesion of the sizing agent and entanglement of the fibers are incorporated inside, but as the fibers are gradually moved in the width direction and the thickness is gradually reduced, the incorporated uneven adhesion of the sizing agent and entanglement of the fibers are gradually solved in the expansion region $B_i$. Thus, as compared with the expansion of spread width immediately after fiber-spreading, the influences of the uneven adhesion of the sizing agent and entanglement of the fibers can be suppressed, and fibers can be spread while the fibers are untangled and uniformly distributed.

The uneven adhesion of the sizing agent and entanglement of the fibers of the fiber bundle have the most serious influences in the first fiber-spreading. The entire fiber bundle might be twisted in the stages of manufacture of the fiber bundle or winding around the bobbin, and a continuously stable spread width might not be able to be obtained during fiber spreading of the fiber bundle or split might occur in the fiber bundle during fiber spreading.

In the present invention, in the first region set $S_1$, by setting the spread width $W_1$ in the fiber-spreading region $A_1$ to satisfy with respect to the original width $W_0$:

$$1 < (W_1/W_0) \leq 5,$$

the fibers are uniformly distributed while the influences of the entanglement between the fibers in the fiber bundle and the twist of the entire fiber bundle are suppressed, and stable fiber-spreading can be performed. If the spread width $W_1$ expands to 5 times or more the original width $W_0$, the entanglement of the fibers in the fiber bundle or the twist of the entire fiber bundle become stronger to the contrary during fiber-spreading, and a continuously stable spread width might not be able to be obtained due to the influences thereof or split might occur between the fiber bundles. More preferably, it is set to:

$$2 \leq (W_1/W_0) \leq 4.$$

By setting the spread width $W_1$ to twice or more the original width $W_0$, fiber-spreading efficiency can be improved. Also, by setting the spread width $W_1$ within 4 times the original width $W_0$, fiber-spreading with favorable fiber distribution can be performed while the influences of the entanglement of the fibers in the fiber bundle and the twist of the entire fiber bundle are further suppressed.

Figure 4:
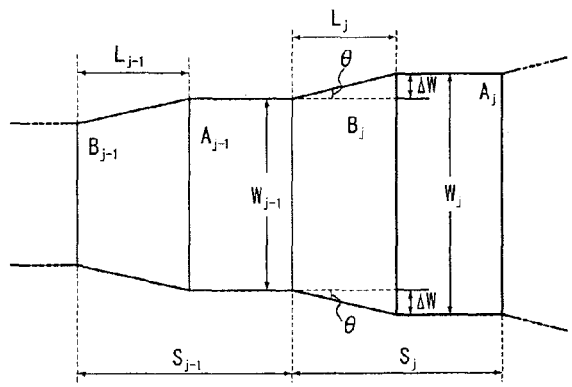
FIG. 4 is an explanatory diagram relating to a region set $S_{j-1}$ and a region set $S_j$.

Subsequently, the region sets $S_j$ (j=2, ..., n) subsequent to the first region set $S_1$ will be described. FIG. 4 is an explanatory diagram relating to the region set $S_{j-1}$ and the region sets $S_j$. The region set $S_{j-1}$ includes the fiber-spreading region $A_{j-1}$ and the expansion region $B_{j-1}$, the fiber-spreading region $A_{j-1}$ is set with the spread width $W_{j-1}$ and the expansion region $B_{j-1}$ is set with the length $L_{j-1}$ of the fiber bundle in the feeding direction. Similarly, the region set $S_j$ includes the fiber-spreading region $A_j$ and the expansion region $B_j$, the fiber-spreading region $A_j$ is set with the spread width $W_j$ and the expansion region $B_j$ is set with the length $L_j$ of the fiber bundle in the feeding direction.

The expansion region $B_j$ expands toward the end of the downstream side, and the spread width $W_j$ is wider than the spread width $W_{j-1}$. Since the expansion region $B_j$ is set so as to expand to the both sides by the equal distance, a distance portion $\Delta W$ expanded on the both sides is:

$$\Delta W = (W_j - W_{j-1})/2.$$

Assuming that an angle expanding on the both sides of the expansion region $B_j$ in the feeding direction is $\theta$, $$\tan \theta = \Delta W/L_j = (W_j - W_{j-1})/2L_j.$$

Here, it is preferable that the expansion region $B_j$ is set so as to expand to the both sides by the equal distance. If such setting is made that expansion is biased, the movement of the fibers in the width direction caused by fiber-spreading is biased, and fiber-spreading with uniform fiber distribution becomes difficult.

In the region set $S_j$, by setting the expansion angle $\theta$ of the expansion region $B_j$ to 30° or less, the fibers can be uniformly distributed in the fiber-spreading region $A_j$ and can be spread to the spread width $W_j$. If the angle $\theta$ becomes larger than 30°, fiber-spreading is performed in the expansion region $B_j$ without fully solving the uneven adhesion of the sizing agent or entanglement of the fibers, and a gap can occur between the fibers or the density of the fibers become uneven and uniform distribution cannot be realized continuously.

Therefore, by setting the spread width $W_{j-1}$ of the fiber-spreading region $A_{j-1}$, the spread width $W_j$ of the fiber-spreading region $A_j$, and the length $L_j$ of the fiber bundle in the feeding direction in the expansion region $B_j$ so that they satisfy the following:

$$0 < (W_j - W_{j-1})/2L_j \leq \tan 30°,$$

fiber-spreading with fibers of the fiber bundle uniformly distributed can be continuously performed.

The smaller $\theta$ becomes, the more gradually fibers move, which is preferable for fiber distribution, but the distance L becomes long, and the size of the device increases. On the contrary, the larger $\theta$ becomes, the shorter the distance L becomes, and the size of the device is reduced, but a movement amount of each fiber also becomes larger, which can easily affect fiber distribution. Thus, $5° \leq \theta \leq 20°$ is more preferable angle for $\theta$.

By setting as above, pre-spreading is performed by untangling the fibers while the uneven adhesion of the sizing agent and entanglement of the fibers are solved in the expansion region $B_i$ so that the fibers are uniformly distributed in the fiber-spreading region $A_i$, the spread width is expanded to a predetermined width, and the thickness can be made uniform. And by setting a plurality of region sets $S_i$, each including the fiber-spreading region $A_i$ and the expansion region $B_i$, a thinner spread fiber sheet with a wider spread width than before can be realized.

In the case of a carbon fiber bundle having the number of fibers of 12000, for example, even by performing fiber-spreading to have the spread width of approximately 27 mm (the weight is approximately 30 g/m²) or moreover, to have the spread width of approximately 40 mm (the weight is approximately 20 g/m²), the spread fiber sheet in which the fibers are uniformly distributed can be formed.

According to the present invention, an extremely thinner spread fiber sheet as compared with the prior-art continuous fiber-spreading can be obtained, and regarding the fiber bundle having the large number of fibers, for which wide fiber-spreading has been difficult with the prior-art technology, can be subjected to wide fiber-spreading excellent in fiber distribution.

Figure 5:
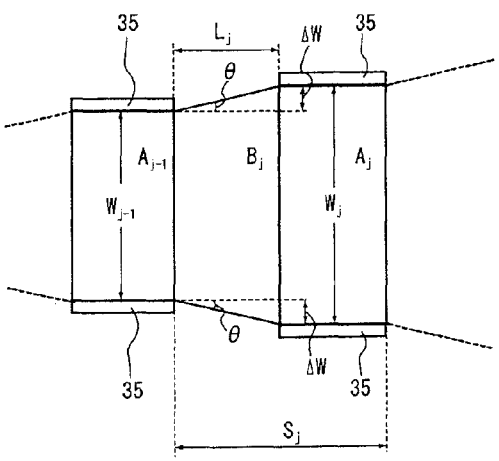
FIG. 5 is an explanatory diagram relating to a spread width $W_j$ in a fiber-spreading region $A_j$.
Figure 6:
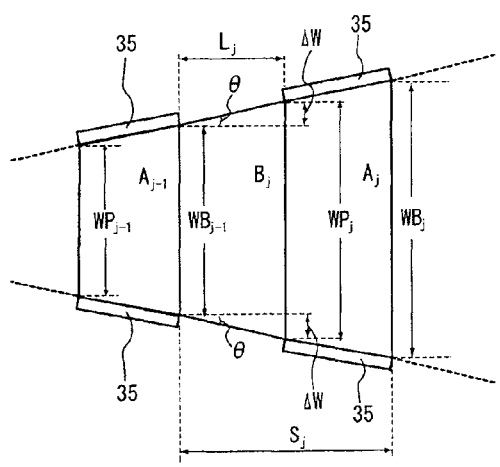
FIG. 6 is another explanatory diagram relating to a spread width $W_j$ in a fiber-spreading region $A_j$.

FIGS. 5 and 6 are explanatory diagrams relating to the spread width $W_j$ in the fiber-spreading region $A_j$. The spread width $W_j$ in the fiber-spreading region $A_j$ is, as from the schematic explanatory diagram in FIG. 1, for example, regulated by the pair of guide members 35 mounted in the feeding direction of the fiber bundle on the both sides of the upper opening portion of the cavity tube 32.

If the shape of the upper opening portion of the cavity tube 32 is as in FIG. 1, that is, a rectangular shape as in FIG. 5, the guide members 35 are mounted in parallel with the feeding direction. And, the lengths on the upstream side and the downstream side in the fiber-bundle feeding direction in the cavity tube 32 (cavity tube width), that is, the spread widths $W_j$ become the same.

The shape of the cavity tube 32 may be, as illustrated in FIG. 6, for example, a shape having the downstream-side length longer than the upstream-side length in the fiber-bundle feeding direction. That is, a pipe having a shape expanding in the feeding direction may be used. In this case, the pair of guide members 35 are mounted on the both sides of the cavity tube opening portion so as to expand in the feeding direction.

In the case of FIG. 6, the spread width $WB_j$ on the downstream side in the feeding direction of the fiber bundle can be the spread width $W_j$ in the fiber-spreading region $A_j$. However, in the equation to find the angle $\theta$ expanding in the feeding direction on the both sides of the expansion region $B_j$, $$\tan \theta = \Delta W/L_j = (W_j - W_{j-1})/2L_j$$

the width $WP_j$ on the upstream side in the feeding direction of the fiber bundle in the fiber-spreading region $A_j$ is applied to the width $W_j$, and the width $WB_{j-1}$ on the downstream side in the feeding direction of the fiber bundle in the fiber-spreading region $A_{j-1}$ is applied to the width $W_{j-1}$.

Figure 7:
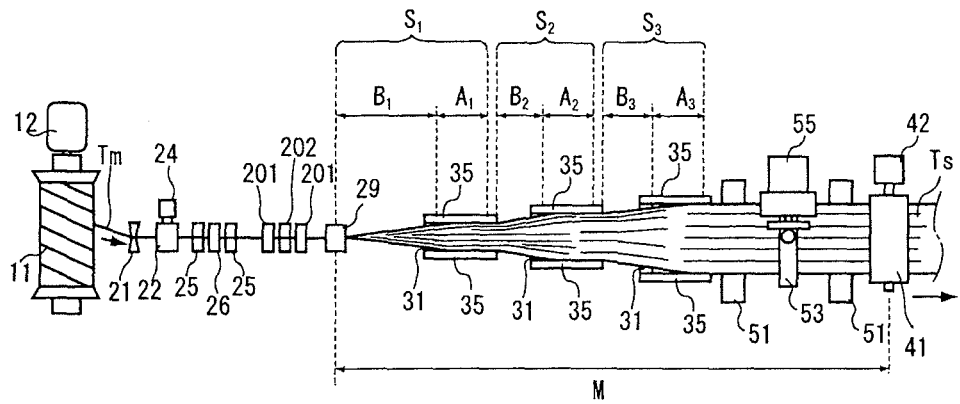
FIG. 7 is a schematic plan view relating to another device example in which the fiber-spreading method according to the present invention is implemented.
Figure 8:
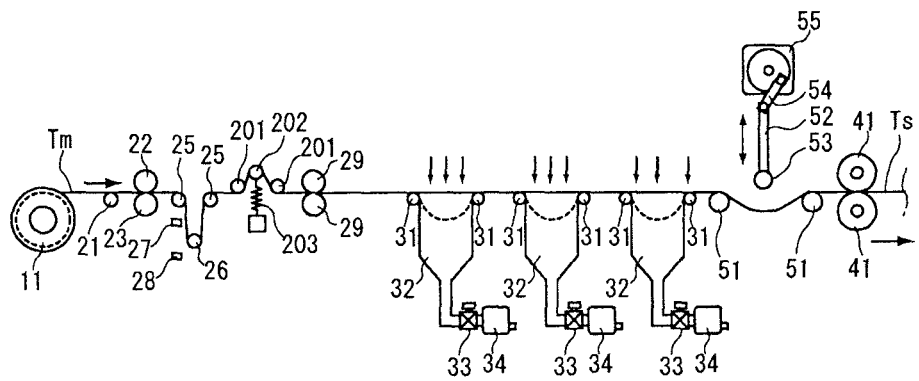
FIG. 8 is a schematic side view relating to the device example shown in FIG. 7.

FIGS. 7 and 8 are a schematic plan view and a schematic side view relating to another device example in which the fiber-spreading method according to the present invention is implemented. The same reference numerals are given to the same portions as those in the device example illustrated in FIGS. 1 and 2, and the description for those portions will be omitted.

In this device example, a vertical vibration giving mechanism is provided on the downstream side of the spread portion. The vertical vibration giving mechanism has a pressing roll 53 arranged between a pair of support rolls 51. The pressing roll 53 is mounted on the lower end of an elevation rod 52, and the upper end of the elevation rod 52 is connected to one end of a crank arm 54. The other end of the crank arm 54 is connected to an output shaft of a crank motor 55, and by rotating and driving the crank motor 55, the elevation rod 52 repeats an elevation operation. Thus, the pressing roll 53 is vertically moved and struck against the upper face of the spread fiber sheet Ts spread and passing on the upper side of the support rolls 51 in a predetermined cycle.

When the pressing roll 53 is struck against the spread fiber sheet Ts and the spread fiber sheet Ts is pushed between the support rolls 51, the tension of the spread fiber sheet Ts temporarily increases so as to cause a tension state, the pressing roll 53 rises and separates from the spread fiber sheet Ts, and then, the tension of the spread fiber sheet Ts decreases so as to cause a relaxed state.

This repetition of the tension state and the relaxed state of the spread fiber sheet Ts propagates to the fiber bundle Tm in the spread portion, and the degree by which the fiber bundle Tm is bent in the spread portion changes over time. That is, if the fiber bundle Tm is tensed in the spread portion, the degree by which the fiber bundle Tm is bent changes in a decreasing direction, while if the fiber bundle Tm is relaxed, the degree by which the fiber bundle Tm is bent changes in an increasing direction. In the fiber-spreading action, if the direction to increase the degree by which the fiber bundle is bent and the direction to decrease it are cyclically repeated and the fiber bundle is subjected to the action of a fluid, the fibers gradually move in the width direction in a more straight state, and wider fiber-spreading with favorable fiber distribution can be performed more easily. That is, the fiber-spreading efficiency can be improved. In each spread portion, if the fiber bundle is tensed and the fiber bundle Tm is not bent, the fiber bundle can be bundled more easily, and the spread width becomes unstable. Thus, it is important to ensure the bend of the fiber bundle in each spread portion and to stabilize the spread width by adjusting the vertically moving speed of the pressing roll 53 in accordance with the feeding speed of the fiber bundle and by adjusting the tense state and the relaxed state of the spread fiber sheet Ts.

The vibration given to the spread fiber sheet Ts is also propagated to the upstream side of the nip rolls 29. In this device example, a mechanism which removes propagated vibration is provided between the support rolls 25 and the nip rolls 29. As a mechanism example, a pair of support rolls 201 and a tension roll 202 are provided, and this tension roll 202 is arranged between the pair of support rolls 201 so that the fiber bundle Tm passing on the lower side of the support rolls 201 passes on the upper side of the tension roll 202. The tension roll 202 is mounted on a spring member 203, and the tension roll 202 is also vibrated vertically in accordance with the vibration of the fiber bundle so as to remove the vibration of the fiber bundle.

Since the nip rolls 29 are provided, return of the fiber bundle by the influence of the vibration of the tension roll 202 does not affect the spread portion, and the fiber bundle is stably bent in each cavity tube.

In this device example, a region from the nip rolls 29 to the take-up roll 41 is set to the movable region M. Spaces between the guide rolls 31 in the spread portion are set to fiber-spreading regions $A_1$ to $A_3$, respectively. The upstream sides of respective fiber-spreading regions are set to expansion regions $B_1$ to $B_3$, respectively, in which the fiber bundle Tm expand to the end. The expansion region $B_1$ is set from the nip rolls 29 to the fiber-spreading region $A_1$.

The region sets $S_1$ to $S_3$, each including a pair of the fiber-spread region and the expansion region, are arranged in the feeding direction of the fiber bundle Tm in the movable region M.

The vertical vibration giving mechanism may be arranged at any location as long as it is in a range of the movable region M. For example, the mechanism may be arranged in any of the expansion regions $B_1$ to $B_3$ or the fiber-spreading regions $A_1$ to $A_3$.

In this device example, the degree by which the fiber bundle is bent in the fiber-spreading region is changed over time by the vertical vibration giving mechanism. By setting the rotation of the crank motor 55 constant, the degree by which the fiber bundle is bent can be changed cyclically. Also, by executing control of temporally changing the rotation of the crank motor 55, the degree by which the fiber bundle is bent can be changed irregularly. Such control can be handled by the spread state of the fiber bundle.

As another method of temporally changing the degree by which the fiber bundle is bent in the fiber-spreading region, by bringing an oval rotary body into contact with the fiber bundle Tm or the spread fiber sheet Ts and by rotating this oval rotary body, the degree by which the fiber bundle is bent in the fiber-spreading region can be temporally changed. Also, a method can be also used in which the volume of the fluid flowing through each spread portion is temporally changed by temporally controlling an open/closed amount of each flow control valve 33 so that the degree by which the fiber bundle is bent in the fiber-spreading region is temporally changed.

In each region set, as described above, by setting the spread width of each fiber-spreading region and the length of each expansion region in the feeding direction, pre-spreading is performed by untangling the fibers while uneven adhesion of the sizing agent and entanglement of the fibers are solved in the expansion region and the fibers are uniformly distributed in the fiber-spreading region and the spread width can be expanded to a predetermined width, and the thickness can be made uniform. By arranging a plurality of the region sets, each including the fiber-spreading region and the expansion region, a thinner spread fiber sheet with a wider spread width than before can be completed.

Figure 9:
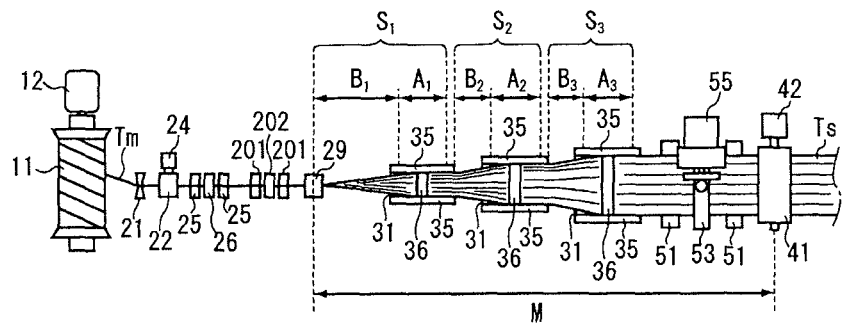
FIG. 9 is a schematic plan view relating to another device example in which the fiber-spreading method according to the present invention is implemented.
Figure 10:
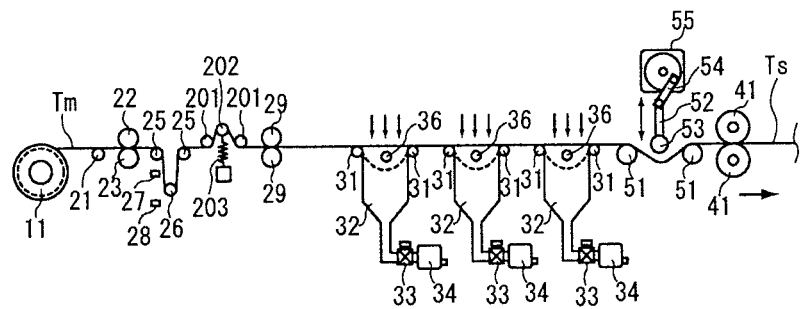
FIG. 10 is a schematic side view relating to the device example shown in FIG. 9.

FIGS. 9 and 10 are a schematic plan view and a schematic side view relating to another device example in which the fiber-spreading method according to the present invention is implemented. The same reference numerals are given to the same portions as those in the device example illustrated in FIGS. 7 and 8, and the description for those portions will be omitted.

In this device example, a bend ensuring roll 36 is provided in the upper opening portion of the cavity tube 32 in the spread portion. The fiber bundle Tm passing on the upper side of the guide rolls 31 is fed so as to pass on the lower side of the bend ensuring roll 36. Then, even if the degree by which the fiber bundle Tm is bent is reduced by the vertical vibration giving mechanism, the fiber bundle Tm is set to a state curved with a predetermined size by the bend ensuring roll 36. Thus, the fiber bundle Tm is not made straight in each spread portion, and contraction of the spread width of the fiber bundle is prevented. Moreover, if the degree by which the fiber bundle Tm is bent is reduced by the vertical vibration giving mechanism and the fiber bundle Tm is brought into instantaneous contact with the bend ensuring roll 36, distribution and straightness of the fibers in the fiber bundle are improved, and a good-quality spread state can be obtained. That is, the fiber bundle Tm is bent away from the bend ensuring roll 36 in the relaxed state and is bent in instantaneous contact with the bend ensuring roll 36 in the tense state, and by repeating these two states, the fiber bundle is spread wider and with excellent fiber distribution.

In this device example, the vertical vibration giving mechanism is arranged on the downstream side of the fiber-spreading portion $A_3$, but the vertical vibration giving mechanism may be arranged in any of the expansion regions $B_1$ to $B_3$.

In this device example, similarly to the device example illustrated in FIG. 7, the region sets $S_1$ to $S_3$, each including a pair of the fiber-spreading region and the expansion region, are arranged in the feeding direction of the fiber bundle Tm in the movable region M.

In each region set, by setting the spread width of each fiber-spreading region and the length of each expansion region in the feeding direction as above, pre-spreading is performed by untangling the fibers in the expansion region, and by uniformly distributing the fibers in the fiber-spreading region, the spread width is expanded to a predetermined width and the thickness can be made uniform. By arranging a plurality of region sets, each including the fiber-spreading region and the expansion region, a thinner spread fiber sheet with a wider spread width than before can be realized.

Figure 11:
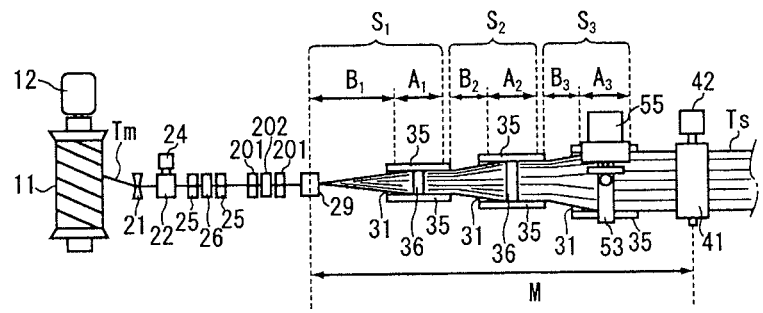
FIG. 11 is a schematic plan view relating to another device example in which the fiber-spreading method according to the present invention is implemented.
Figure 12:
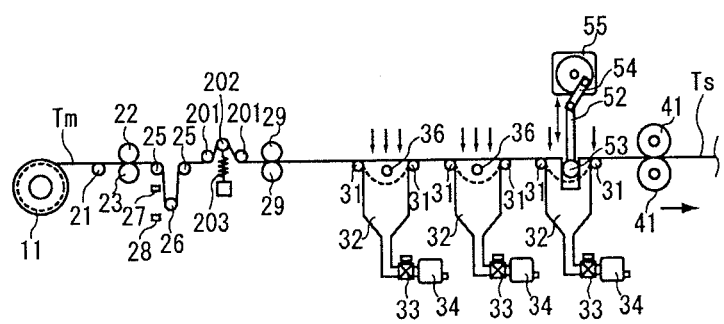
FIG. 12 is a schematic side view relating to the device example shown in FIG. 11.

FIGS. 11 and 12 are a schematic plan view and a schematic side view relating to another device example in which the fiber-spreading method according to the present invention is implemented. The same reference numerals are given to the same portions as those in the device example illustrated in FIGS. 9 and 10, and the description for those portions will be omitted.

In this device example, the vertical vibration giving mechanism is arranged in the spread portion on the lowermost stream side, and the pressing roll 53 is installed as the bend ensuring roll 36. That is, the bend ensuring roll 36 is vibrated in a direction orthogonal to the feeding direction of the fiber bundle or preferably in the bend direction of the fiber bundle. As a result, the tense state and the relaxed state are repeatedly given to the fiber bundle Tm in the spread portion cyclically. By means of this action, bend is actively given to the fiber bundle Tm, that is, the degree by which the fiber bundle is bent can be actively changed and moreover, the spread efficiency can be improved.

In this device example, the pressing roll 53 of the vertical vibration giving mechanism is arranged in the spread portion on the lowermost stream side, but the pressing roll 53 of the vertical vibration giving mechanism may be arranged in any other spread portions. Also, it may be arranged in a plurality of spread portions.

In this device example, too, the region sets $S_1$ to $S_3$, each including a pair of the fiber-spreading region and the expansion region, are arranged in the feeding direction of the fiber bundle Tm in the movable region M similarly to the device example illustrated in FIG. 7.

In each region set, by setting the spread width of each fiber-spreading region and the length of each expansion region in the feeding direction as above, pre-spreading is performed by untangling the fibers in the expansion region, and by uniformly distributing the fibers in the fiber-spreading region, the spread width is expanded to a predetermined width and the thickness can be made uniform. By arranging a plurality of region sets, each including the fiber-spreading region and the expansion region, a thinner spread fiber sheet with a wider spread width than before can be realized.

Figure 13:
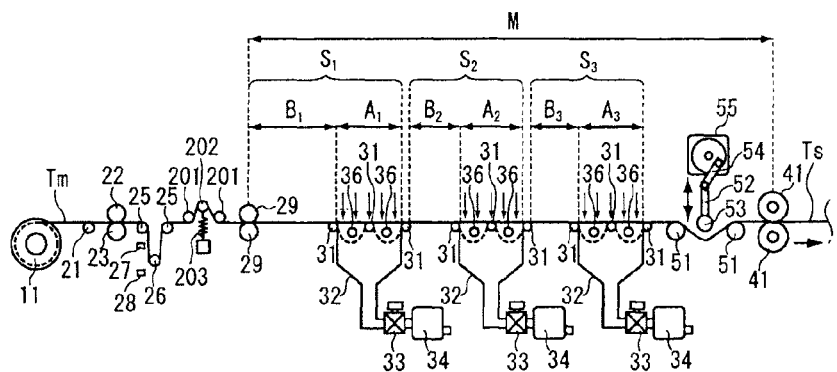
FIG. 13 is a schematic side view relating to another device example in which the fiber-spreading method according to the present invention is implemented.

FIG. 13 is a schematic side view relating to another device example in which the fiber-spreading method according to the present invention is implemented. The same reference numerals are given to the same portions as those in the device example illustrated in FIG. 10, and the description for those portions will be omitted.

In this device example, three guide rolls 31 are provided in the spread portion, and the bend ensuring roll 36 is provided between the guide rolls 31, respectively. Therefore, fiber-spreading is performed in the spread portion with the fiber bundle Tm formed in a state bent in two sections.

In this device example, a space between the guide rolls 31 on the uppermost stream side and on the lowermost stream side is set to a fiber-spreading region, and the region sets $S_1$ to $S_3$, each including a pair of the fiber-spreading region and the expansion region as similarly in the device example illustrated in FIG. 7, are arranged in the feeding direction of the fiber bundle Tm in the movable region M.

In each region set, by setting the spread width of each fiber-spreading region and the length of each expansion region in the feeding direction as above, pre-spreading is performed by untangling the fibers in the expansion region, and by uniformly distributing the fibers in the fiber-spreading region, the spread width is expanded to a predetermined width and the thickness can be made uniform. By arranging a plurality of region sets, each including the fiber-spreading region and the expansion region, a thinner spread fiber sheet with a wider spread width than before can be realized.

In this device example, the vertical vibration giving mechanism is arranged on the downstream side of the spread portion $A_3$ but the vertical vibration giving mechanism may be arranged in any of the expansion regions $B_1$ to $B_3$. Also, as in the device example in FIG. 12, at least one of the bend ensuring rolls 36 in the spread region may be moved vertically by the vertical vibration giving mechanism so as to repeatedly give tension and relaxation to the fiber bundle Tm and to temporally change the degree by which the fiber bundle is bent in the fiber-spreading region.

Figure 14:
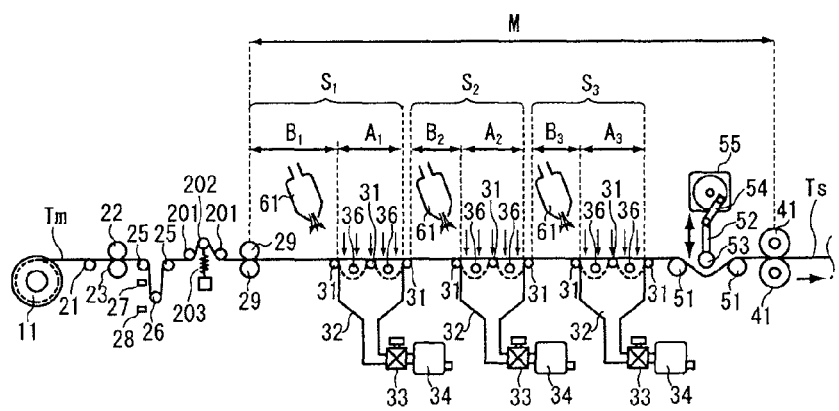
FIG. 14 is a schematic side view relating to another device example in which the fiber-spreading method according to the present invention is implemented.

FIG. 14 is a schematic side view relating to another device example in which the fiber-spreading method according to the present invention is implemented. The same reference numerals are given to the same portions as those in the device example illustrated in FIG. 13, and the description for those portions will be omitted.

In this device example, a heating mechanism 61 which heats the fiber bundle Tm by blowing hot air in correspondence with the spread portion is provided. By heating the fiber bundle Tm to be spread, the sizing agent adhering to the fiber bundle Tm can be softened. Thus, the fibers can be easily untangled in the expansion region, and the fibers are uniformly distributed in the fiber-spreading region.

In this device example, too, the region sets $S_1$ to $S_3$, each including a pair of the fiber-spreading region and the expansion region, are arranged in the feeding direction of the fiber bundle Tm in the movable region M similarly to the device example illustrated in FIG. 13.

In each region set, by setting the spread width of each fiber-spreading region and the length of each expansion region in the feeding direction as above, pre-spreading is performed by untangling the fibers in the expansion region, and by uniformly distributing the fibers in the fiber-spreading region, the spread width is expanded to a predetermined width and the thickness can be made uniform. By arranging a plurality of region sets, each including the fiber-spreading region and the expansion region, a thinner spread fiber sheet with a wider spread width than before can be realized.

Figure 15:
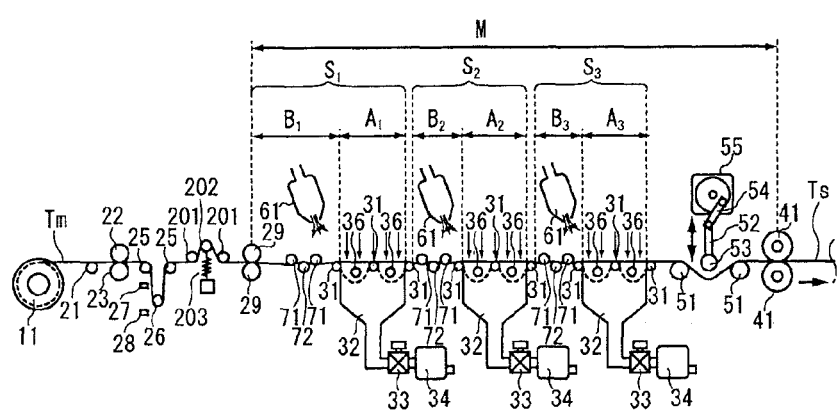
FIG. 15 is a schematic side view relating to another device example in which the fiber-spreading method according to the present invention is implemented.

FIG. 15 is a schematic side view relating to another device example in which the fiber-spreading method according to the present invention is implemented. The same reference numerals are given to the same portions as those in the device example illustrated in FIG. 14, and the description for those portions will be omitted.

In this device example, a pair of contact rolls 71 are arranged on the upper side of the fiber bundle Tm in the expansion region in the width direction of the fiber bundle Tm, and a support roll 72 is arranged between the contact rolls 71 on the lower side. In this device example, the number of the contact rolls is two and the number of support rolls is one, but the numbers may be optional.

The contact roll 71 and the support roll 71 may be rotatable or may be fixed. Since the fiber bundle Tm is fed in contact with each roll, the fiber bundle is crushed in the width direction and at the same time, each fiber is separated from fixation by the sizing agent, which facilitates movement in the width direction, and as a result, the fibers are pre-spread with favorable distribution.

Also, the contact roll 71 may be configured to reciprocate in the width direction of the fiber bundle Tm by a crank mechanism, not shown. When the fiber bundle Tm passes between the contact roll 71 and the support roll 72 in contact therewith, the fibers of the fiber bundle Tm are moved in the width direction by the reciprocal movement of the contact roll 71 and act so that the fibers are uniformly distributed more efficiently.

In this device example, too, the region sets $S_1$ to $S_3$, each including a pair of the fiber-spreading region and the expansion region, are arranged in the feeding direction of the fiber bundle Tm in the movable region M similarly to the device example illustrated in FIG. 13.

In each region set, by setting the spread width of each fiber-spreading region and the length of each expansion region in the feeding direction as above, pre-spreading is performed by untangling the fibers in the expansion region, and by uniformly distributing the fibers in the fiber-spreading region, the spread width is expanded to a predetermined width and the thickness can be made uniform. By arranging a plurality of region sets, each including the fiber-spreading region and the expansion region, a thinner spread fiber sheet with a wider spread width than before can be realized.

Figure 16:
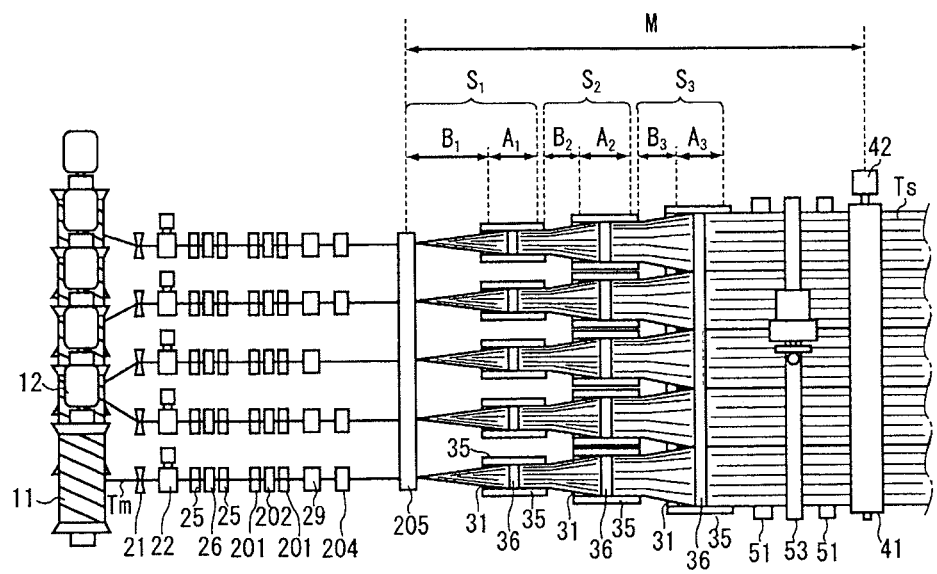
FIG. 16 is a schematic plan view relating to another device example in which the fiber-spreading method according to the present invention is implemented.
Figure 17:
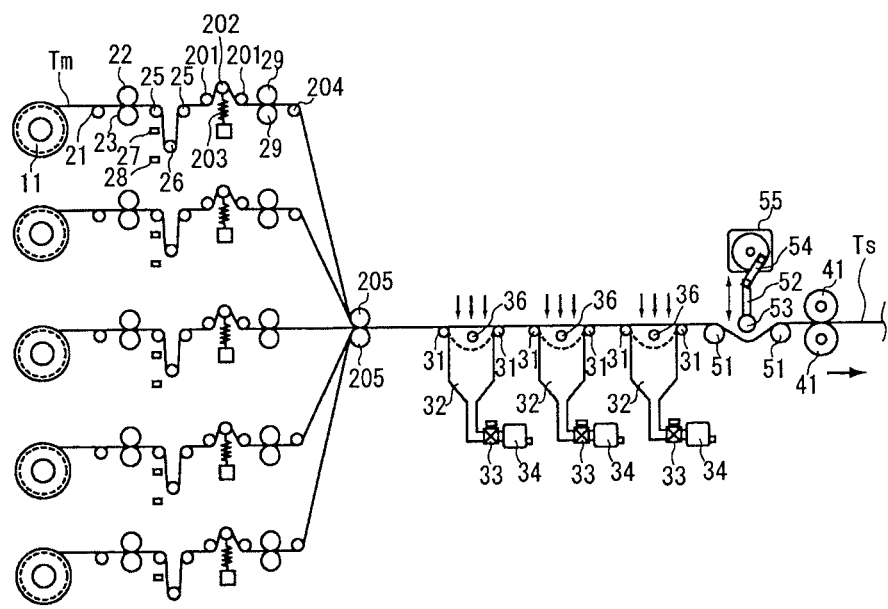
FIG. 17 is a schematic side view relating to another device example shown in FIG. 16.

FIGS. 16 and 17 are a schematic plan view and a schematic side view relating to another device example in which the fiber-spreading method according to the present invention is implemented. In this device example, a plurality of the device examples illustrated in FIGS. 9 and 10 is arranged in parallel and a plurality of fiber bundles Tm is spread in parallel so that a plurality of spread fiber sheets Ts can be formed at the same time. The same reference numerals are given to the same portions as those in the device example illustrated in FIGS. 9 and 10, and the description for those portions will be omitted.

The fiber bundle Tm fed out of each yarn supplier 11 is fed out through the nip rollers 29, respectively, and fed by a guide roll 204 toward an alignment roll 205. The alignment roll 205 sandwiches the fed plurality of fiber bundles Tm altogether and feeds out the plurality of fiber bundles Tm by aligning them with equal intervals on the same plane.

The plurality of fed-out fiber bundles Tm is spread in the three spread portions similarly to the device example illustrated in FIGS. 9 and 10, but the spread portion on the lowermost stream side has an upper opening portion formed over the whole width so that the plurality of the fiber bundles Tm is spread altogether. The spread fiber sheet Ts formed by being spread altogether is given vibration altogether by the pressing roll 53 of the vertical vibration giving mechanism and fed out by the take-up roll 41.

In this device example, a region from the alignment roll 205 to the take-up roll 41 is set to the movable region M. Spaces between the guide rolls 31 in the spread region are set to the fiber-spreading regions $A_1$ to $A_3$, respectively. The upstream sides of respective fiber-spreading regions are set to the expansion regions $B_1$ to $B_3$, expanding toward the ends, respectively. The expansion region $B_1$ is set from the alignment roll 205 to the fiber-spreading region $A_1$.

The spread width $W_3$ in the fiber-spreading region $A_3$ of each fiber bundle Tm in the spread portion on the lowermost stream side has a value obtained by dividing the length of the spread portion in the width direction by the number of fiber bundles passing through the spread portion.

Then, the region sets $S_1$ to $S_3$, each including a pair of the fiber-spreading region and the expansion region, are arranged in the feeding direction of the fiber bundle Tm in the movable region M.

In each region set, by setting the spread width of each fiber-spreading region and the length of each expansion region in the feeding direction as above, pre-spreading is performed by solving the uneven adhesion of the sizing agent and entanglement of fibers in the expansion region, and by uniformly distributing the fibers in the fiber-spreading region, the spread width is expanded to a predetermined width and the thickness can be made uniform. By arranging a plurality of region sets, each including the fiber-spreading region and the expansion region, a thinner spread fiber sheet with a wider spread width than before can be realized.

Figure 18:
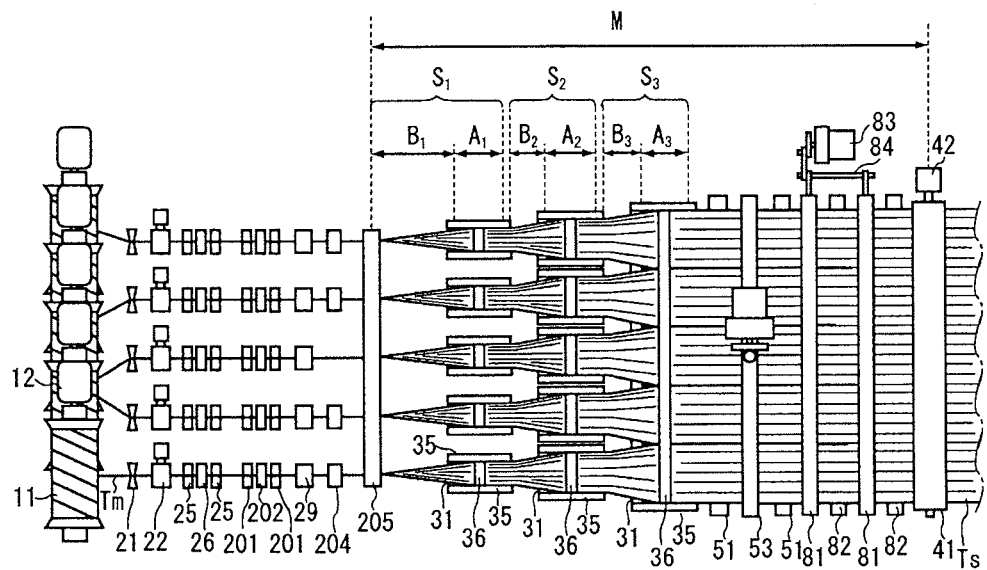
FIG. 18 is a schematic plan view relating to another device example in which the fiber-spreading method according to the present invention is implemented.
Figure 19:
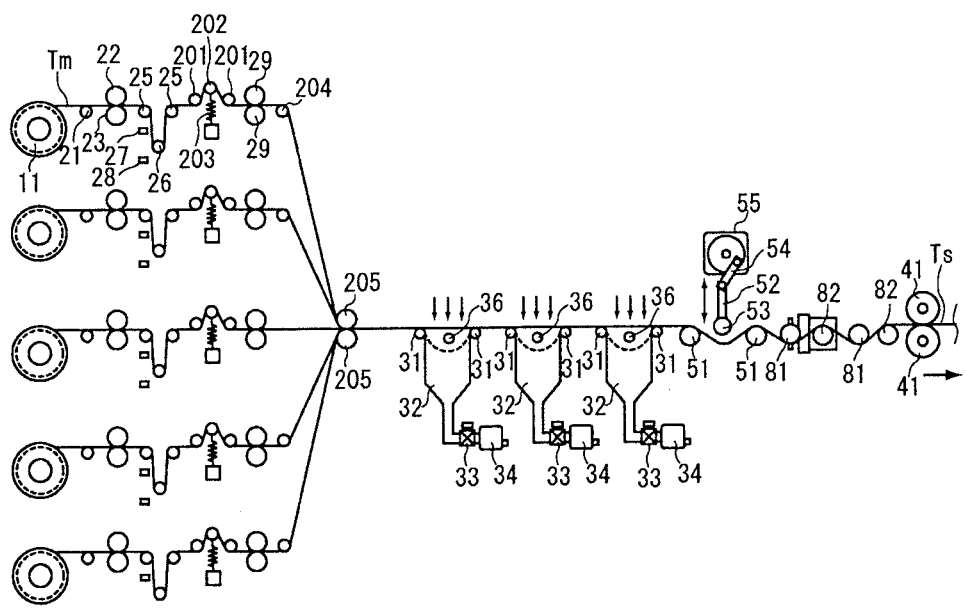
FIG. 19 is a schematic side view relating to another device example shown in FIG. 18.

FIGS. 18 and 19 are a schematic plan view and a schematic side view relating to another device example in which the fiber-spreading method according to the present invention is implemented. The same reference numerals are given to the same portions as those in the device example illustrated in FIGS. 16 and 17, and the description for those portions will be omitted.

In this device example, a width-direction vibration giving mechanism in sliding contact with the fibers of the spread fiber sheet Ts in the width direction is provided on the downstream side of the vertical vibration giving mechanism. The width-direction vibration giving mechanism has a pair of bow bars 81 arranged over the whole width on the upper side of the spread fiber sheet Ts, and the support roll 82 is arranged on the lower side of the spread fiber sheet Ts. The bow bars 81 are connected to a crank mechanism 84, and by driving the crank mechanism 84 by a crank motor 83, the bow bars 81 are moved forward/backward in the width direction of the spread fiber sheet Ts. The bow bars 81 move forward/backward in sliding contact with the fibers of the spread fiber sheet Ts so that the portions where the fibers adhere to each other are softly untangled, and the whole spread fiber sheet Ts can be finished into a single sheet state in which the fibers are uniformly distributed.

In this device example, too, the region sets $S_1$ to $S_3$, each including a pair of the fiber-spreading region and the expansion region, are arranged in the feeding direction of the fiber bundle Tm in the movable region M similarly to the device example illustrated in FIG. 16.

In the three region sets, by setting the spread width of each fiber-spreading region and the length of each expansion region in the feeding direction as above, pre-spreading is performed by untangling the fibers in the expansion region, and by uniformly distributing the fibers in the fiber-spreading region, the spread width is expanded to a predetermined width and the thickness can be made uniform. By arranging a plurality of region sets, each including the fiber-spreading region and the expansion region, a thinner spread fiber sheet with a wider spread width than before can be realized.

In this device example, the width-direction vibration giving mechanism is applied to a plurality of the spread fiber sheets Ts so as to obtain a single wide spread fiber sheet Ts. The width-direction vibration giving mechanism may be applied to one spread fiber sheet Ts so as to have the spread fiber sheet Ts with more favorable fiber distribution.

Figure 20:
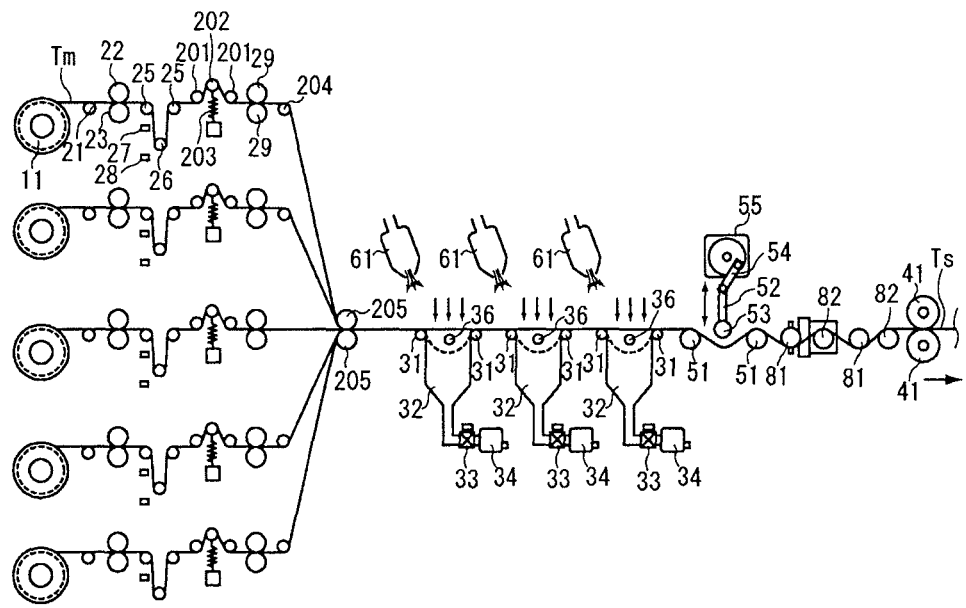
FIG. 20 is a schematic side view relating to another device example in which the fiber-spreading method according to the present invention is implemented.

FIG. 20 is a schematic side view relating to another device example in which the fiber-spreading method according to the present invention is implemented. The same reference numerals are given to the same portions as those in the device example illustrated in FIG. 19, and the description for those portions will be omitted.

In this device example, the heating mechanism 61 which heats the fiber bundle Tm by blowing hot air in correspondence with the spread portion is provided. By heating the fiber bundle Tm to be spread, the sizing agent adhering to the fiber bundle Tm can be softened. Thus, the fibers can be easily untangled in the expansion region, and the fibers are uniformly distributed in the fiber-spreading region.

In this device example, too, the region sets $S_1$ to $S_3$, each including a pair of the fiber-spreading region and the expansion region, are arranged in the feeding direction of the fiber bundle Tm in the movable region M similarly to the device example illustrated in FIG. 18.

In each region set, by setting the spread width of each fiber-spreading region and the length of each expansion region in the feeding direction as above, pre-spreading is performed by untangling the fibers in the expansion region, and by uniformly distributing the fibers in the fiber-spreading region, the spread width is expanded to a predetermined width and the thickness can be made uniform. By arranging a plurality of region sets, each including the fiber-spreading region and the expansion region, a thinner spread fiber sheet with a wider spread width than before can be realized.

By means of any of the above fiber-spreading methods, the spread fiber sheet with wide and thin fiber bundles in the favorable fiber distribution state can be continuously obtained.

In the carbon fiber bundle, the carbon fiber bundle having the number of fibers in the range of 12000 to 24000 and the fineness in the range of 400 g/1000 m to 1100 g/1000 m can be formed into a spread fiber sheet with favorable fiber distribution having the width of 25 mm or more and the thickness of 0.04 mm or less. At this time, the weight of the spread fiber sheet can be set to approximately 30 g/m² or less.

Moreover, the carbon fiber bundle having the number of fibers of 24000 or more and the fineness of 1600 g/1000 m or more can be formed into a spread fiber sheet with favorable fiber distribution having the width of 40 mm or more and the thickness of 0.2 mm or less. In the case of the carbon fiber bundle having the number of fibers of 48000 and the fineness of 3200 g/1000 m, for example, at the spread width of 40 mm, the weight of the obtained spread fiber sheet is approximately 80 g/m². Also, in the case of the carbon fiber bundle having the number of fibers of 60000 and the fineness of 4000 g/1000 m, for example, at the spread width of 40 mm, the weight of the obtained spread fiber sheet is approximately 100 g/m².

The maximum width and the minimum thickness of the spread fiber sheet obtained by fiber-spreading are those when the bundled fibers are aligned in one row in the width direction. In this fiber-spreading method, the fiber bundle is gradually spread in the width direction, and thus, in the case of the fiber bundle in which the fibers constituting the fiber bundle are aligned in the favorable state and the fibers are not entangled, the fiber bundle in which the bundled fibers are aligned in one row in the width direction can be also spread.

For example, in the case of the carbon fiber bundle having the single fiber diameter of 0.007 mm and the number of fibers of 12000, the spread fiber sheet having the spread width of 84 mm and the thickness of 0.007 mm can be obtained by this fiber-spreading method.

Since this fiber-spreading method can be also applied to the fiber bundle having the large number of fibers, even in the case of the large-fineness carbon fiber bundle having the number of fibers of 60000 or more, fiber-spreading to the width of 40 mm or more is possible, and at present, the spread fiber sheet having the weight of 120 to 160 g/m² created by using the carbon fiber bundle having the number of fibers of 12000 to 24000 can be obtained.

Here, the width and the thickness of the spread fiber bundle are measured in a state in which the spread fiber bundle is left naturally. The spread width is measured by using a length meter that can measure to 1 mm at the minimum, and the thickness is measured by an outside micrometer having the minimum display amount of 0.001 mm regulated by JIS B 7502 (corresponding to the International Standards ISO 3611).

Regarding the measurement of the width and the thickness of the spread fiber sheet, measurement is made not only at one spot but at plural spots in order to check continuous stability of the fiber-spreading. For example, measurement is made at 10 spots with intervals of 10 cm, 10 spots with intervals of 1 m or 10 spots with intervals of 10 min the length direction. Regarding the thickness, the thickness from the end portion to the end portion in the width direction of a spot to be measured is measured by an outside micrometer in order to measure variation in the thickness in the width direction. For example, by using a value a obtained by dividing the width of the spread fiber sheet by the diameter of the measured surface of the outside micrometer (if indivisible, the value obtained by rounding up to the tenth), the thickness at a position where the width from the end portion to the end portion is equally divided into a parts in the width direction at the measurement spot.

Regarding the fiber distribution of the spread fiber sheet, if the fibers are uniformly distributed, the variation in the thickness in the width direction is small. In the carbon fiber bundle, if the carbon fiber bundle having the number of fibers in the range of 12000 to 24000 and the fineness in the range of 400 g/1000 m to 1100 g/1000 m is formed into a spread fiber sheet with favorable fiber distribution having the width of 25 mm or more and the thickness of 0.04 mm or less, the variation is ±0.01 mm or less of the average thickness. Since the single fiber diameter of the carbon fiber is 0.005 to 0.007 mm, the variation is one to two carbon fibers.

Also, if the large-fineness carbon fiber bundle having the number of fibers of 24000 or more and the fineness of 1600 g/1000 m or more is formed into a spread fiber sheet with favorable fiber distribution having the width of 40 mm or more and the thickness of 0.2 mm or less, the variation is ±0.02 mm or less of the average thickness. Since the single fiber diameter of the carbon fiber is 0.005 to 0.007 mm, the variation is three to four fibers.

If the fiber-spreading is sequentially performed with stability, variations in the width and the thickness of the spread fiber sheet become small. In the carbon fiber bundle, if the carbon fiber bundle having the number of fibers in the range of 12000 to 24000 and the fineness in the range of 400 g/1000 m to 1100 g/1000 m is formed into a spread fiber sheet with favorable fiber distribution having the width of 25 mm or more and the thickness of 0.04 mm or less, the width becomes within ±10% of the average spread width and the thickness becomes ±0.01 mm or less of the average thickness.

Also, if the large-fineness carbon fiber bundle having the number of fibers of 24000 or more and the fineness of 1600 g/1000 m or more is formed into a spread fiber sheet with favorable fiber distribution having the width of 40 mm or more and the thickness of 0.2 mm or less, the width becomes within ±10% of the average spread width and the thickness becomes ±0.02 mm or less of the average thickness.

Figure 21:
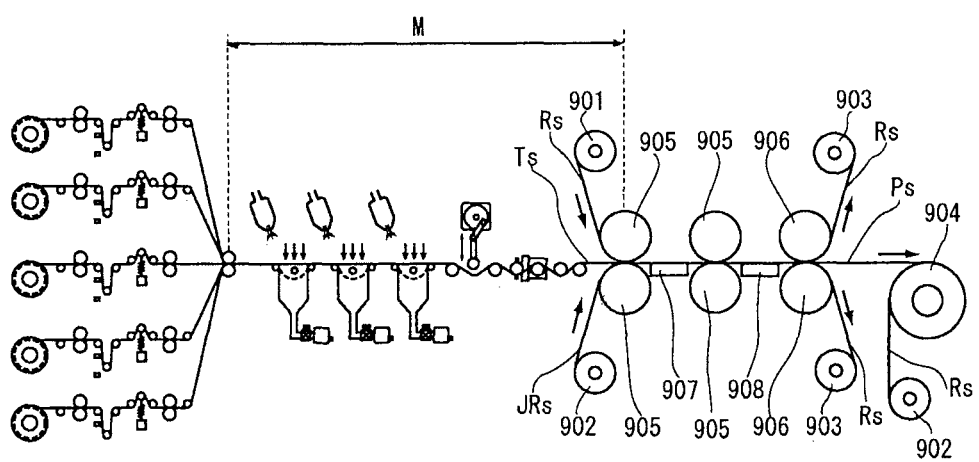
FIG. 21 is a schematic side view relating to a device example in which manufacture of a fiber-reinforced sheet according to the present invention is implemented.

FIG. 21 is a schematic side view relating to a manufacturing process of a fiber-reinforced sheet Ps according to the present invention. This is an explanatory diagram relating to a process in which a resin-adhering release sheet JRs is continuously bonded to one face of the wide spread fiber sheet Ts obtained by the device example in FIG. 20, and heating and pressurization are applied so as to manufacture the fiber-reinforced sheet Ps.

The resin-adhering release sheet JRs from a resin-adhering release sheet supply mechanism 902 is continuously supplied to one face of the spread fiber sheet Ts so that the resin surface adheres to the spread fiber sheet Ts, and a release sheet Rs is continuously supplied from a release sheet supply mechanism 901 to the other face of the spread fiber sheet Ts, and a heating and pressurizing roll 905, a heating plate 907, a heating and pressurizing roll 905, a cooling plate 908, and a cooling roll 906 are made to run so as to obtain a fiber-reinforced sheet Ps in which the spread fiber sheet Ts and the resin adhere to each other or the fiber bundle in the spread fiber sheet Ts is impregnated with the resin. In FIG. 21, after the cooling roll 906 is made to run, the release sheets Rs bonded on the upper and lower both faces of the fiber-reinforced sheet Ps are taken up by release sheet take-up mechanisms 903, respectively, and the fiber-reinforced sheet Ps is bonded to the new release sheet Rs supplied from the release sheet supply mechanism 902 and taken up by a product take-up mechanism 904.

The resin-adhering release sheet JRs is a sheet in which a resin adheres to one face of the release sheet Rs, and a thermosetting resin or a thermoplastic resin is used as the resin to adhere. As the thermosetting resins, epoxy resin, unsaturated polyester resin, phenol resin or the like are used, and as the thermoplastic resins, polypropylene, polyethylene, polystyrene, polyamide (polyamide 6, polyamide 66, polyamide and the like), polyacetal, polycarbonate, acrylonitrile-butadiene-styrene copolymer (ABS), polyethylene terephthalate, polybutylene terephthalate, polyetherimide, polyether sulfone, polyphenylene sulfide, polyetherketone, polyetheretherketon or the like are used. In the case of the thermoplastic resin, a polymer alloy obtained by mixing two or more types of these thermoplastic resins may be used.

For the release sheet Rs, release-treated paper, that is, release paper or fluorine-resin sheet, thermosetting polyimide resin sheet or the like is used.

As a resin-adhering state to the release sheet Rs includes a state in which the resin is applied on one face of the release sheet Rs and adheres in a sheet state or a state in which a powder-state resin is distributed and made to adhere to one face of the release sheet Rs and the like.

By controlling the heating temperatures of the heating and pressurizing roll 905 and the heating plate 907 or a pressurizing force of the heating and pressurizing roll 905, the resin is made to adhere to one face of the spread fiber sheet Ts or the spread fiber sheet Ts is impregnated with the resin.

Here, the adhesion of the resin to the spread fiber sheet Ts can be considered a state in which the resin is heat-sealed to the whole surface or a plurality of portions on one face or on the both faces of the spread fiber sheet or an adhesive which does not affect dynamic characteristics of a molded product is applied thin so as to bond the spread fiber sheet and the resin to each other so as to integrate them. When the resin is heat-sealed to the spread fiber sheet, a surface layer portion of the spread fiber sheet might be slightly impregnated with the resin, but this state can be also considered as an adhesion state.

Here, the impregnation of the spread fiber sheet Ts with the resin is that the resin enters a space between the fibers constituting the spread fiber sheet and the fibers and the resin are integrated. The state in which the resin enters substantially all the spaces in the spread fiber sheet is referred to as being impregnated in many cases, but in the present invention, half-impregnated state in which some spaces are left can be also handled as being impregnated.

The number of the heating and pressurizing rolls 905, the cooling rolls 906, the heating plates 907, and the cooling plates 908 can be arbitrarily determined in accordance with a working speed. Moreover, in FIG. 21, the resin-adhering release sheet JRs is supplied only to one face of the spread fiber sheet Ts, but the fiber-reinforced sheet Ps in which the resin adheres to the upper and lower faces of the spread fiber sheet Ts or the fiber-reinforced sheet Ps in which the upper and lower faces of the spread fiber sheet Ts are resin-impregnated may be obtained by supplying the resin-adhering release sheet JRs to both the upper and lower faces.

In this device example, a region from the alignment roll 205 to the first heating and pressurizing roll 905 is set to the movable region M. The region sets $S_1$ to $S_3$, each including a pair of the fiber-spreading region and the expansion region, are arranged in the feeding direction of the fiber bundle Tm in the movable region M similarly to the device example illustrated in FIG. 20.

By making the resin adhere or by resin-impregnating the thin spread fiber sheet Ts with a large spread width and excellent in fiber distribution, in which a plurality of region sets, each including the expansion region and the fiber-spreading region, obtained by this fiber-spreading method are arranged, the fiber-reinforced sheet Ps which fully exerts the dynamic characteristics unique to the fiber, is homogenized in the width direction and in the thickness direction with fewer defects causing stress concentration, and moreover, excellent in moldability, that is, draping performance can be obtained.

Figure 22:
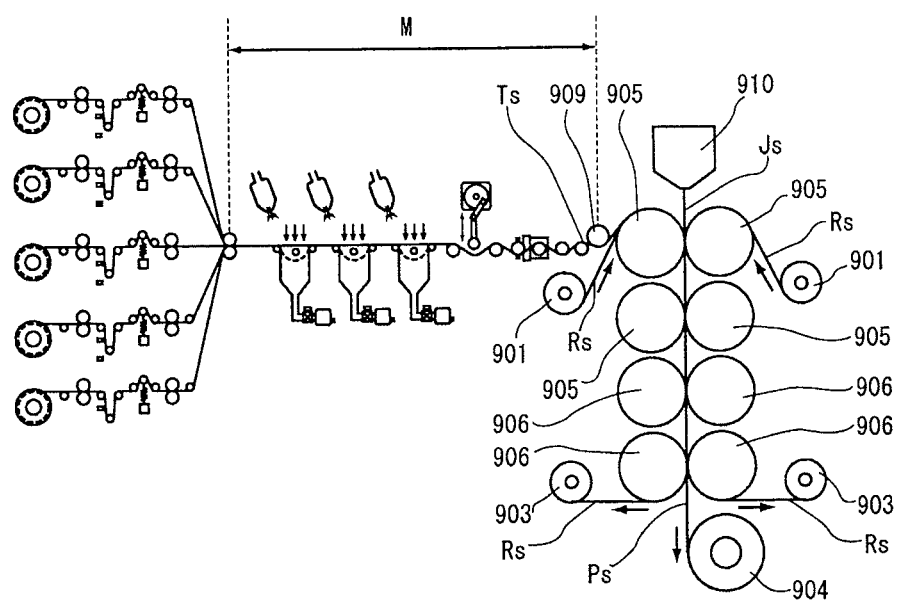
FIG. 22 is a schematic side view relating to another device example in which manufacture of a fiber-reinforced sheet according to the present invention is implemented.

FIG. 22 is another schematic side view relating to a manufacturing process of the fiber-reinforced sheet Ps according to the present invention. This is an explanatory diagram relating to the manufacturing process of the fiber-reinforced sheet Ps by continuously overlapping a resin sheet Js on one face of the wide spread fiber sheet Ts obtained by the device example in FIG. 20 and by performing heating and pressurizing.

After running on a reverse roll 909, the spread fiber sheet Ts obtained by this fiber-spreading device is supplied to the heating and pressurizing roll 905, overlapped on the resin sheet Js supplied from a resin push-out mechanism 910, and runs on a pair of the heating and pressurizing rolls 905 and a pair of cooling rolls 906 so as to obtain the fiber-reinforced sheet Ps in which the spread fiber sheet Ts and the resin sheet Js are bonded together or the fiber bundles of the spread fiber sheet Ts is impregnated with the resin sheet Js is obtained. In FIG. 22, the release sheet Rs is continuously supplied from the release sheet supply mechanism 901 from both sides of the first heating and pressurizing rolls 905, and after running on the first cooling rolls 906, the release sheet Rs bonded on the both faces of the fiber-reinforced sheet Ps are taken up by the release sheet take-up mechanisms 903, respectively, and the fiber-reinforces sheet Ps is taken up by the product take-up mechanism 904.

The resin sheet Js is a sheet-shaped resin pushed out of the resin push-out mechanism 910, and a thermoplastic resin or the like is used. The pushed out resin may be a single thermoplastic resin or may be a polymer-alloyed resin in which two or more types of resins are input.

For the release sheet Rs, release-treated paper, that is, release paper or fluorine-resin sheet, thermosetting polyimide resin sheet or the like is used similarly to FIG. 21. Depending on the heating temperature condition, the release sheet Rs is not supplied and the fiber-reinforced sheet Ps can be manufactured in a state without the release sheet.

By controlling the heating temperature or the pressurizing force of the heating and pressurizing rolls 905, a state in which the resin sheet Js adheres to one face of the spread fiber sheet Ts, that is, they are bonded together or a state in which the spread fiber sheet Ts is impregnated or half-impregnated with the resin can be obtained.

The number of the heating and pressurizing rolls 905 and the cooling rolls 906 can be arbitrarily determined in accordance with a working speed.

Moreover, by installing another set of this fiber-spreading device on the side opposite to the heating and pressurizing roll 905, the fiber-reinforces sheet Ps in which the spread fiber sheet Ts is made to adhere to or impregnates the both sides of the resin sheet Js can be obtained.

In this device example, a region from the alignment roll 205 to the reverse roll 909 is set to the movable region M. The region sets $S_1$ to $S_3$, each including a pair of the fiber-spreading region and the expansion region, are arranged in the feeding direction of the fiber bundle Tm in the movable region M similarly to the device example illustrated in FIG. 20.

In the device examples up to FIG. 21, the fiber bundle or the spread fiber sheet is sandwiched by the pair of rolls and the movable region is set, but in this device example in FIG. 22, the movable region is set by the nip rolls (the pair of rolls) and the reverse roll. By forming the reverse roll of a roll made of an elastic material such as rubber, by prolonging a contact length between the spread fiber sheet Ts and the roll by increasing the roll diameter, or by bringing the reverse roll into contact with the heating and pressurizing roll, movement of the fibers of the spread fiber sheet Ts in the width direction is regulated. Therefore, a space up to the reverse roll can be set to the movable region.

By making the resin sheet adhere to or by resin-impregnating the thin spread fiber sheet Ts with a large spread width and excellent in fiber distribution obtained by this fiber-spreading method, the fiber-reinforced sheet Ps which fully exerts the dynamic characteristics unique to the fiber, is homogenized in the width direction and in the thickness direction with fewer defects causing stress concentration, and moreover, excellent in moldability, that is, draping performance can be obtained.

EXAMPLE

Example 1

In the device illustrated in FIGS. 11 and 12, a device configuration in which two spread portions were arranged, the vertical vibration-giving mechanism was installed in the downstream-side spread portion, and the heating mechanism 61 illustrated in FIG. 14 was put into practice. As the fiber bundle, a carbon fiber (by Toray Industries Inc., Torayca T700SC-12K: fiber diameter of approximately 7 μm and the number of fibers of 12000) was used. The original width $W_0$ of the fiber bundle was approximately 7 mm.

The spread width $W_1$ of the fiber-spreading region $A_1$ was set to 16 mm, the spread width $W_2$ of the fiber-spreading region $A_2$ was set to 27 mm, the length $L_2$ of the expansion region $B_2$ in the feeding direction was set to 30 mm, and the expansion angle θ was set to approximately 10°. The length of each fiber-spreading region between the guide rolls was 20 mm, and the diameter of the guide roll was 6 mm, and the pearskin finish was applied to the surface. The diameter of the bend ensuring roll was 10 mm, and the pearskin finish was applied to the surface. The bend ensuring roll was positioned and set below the guide rolls by 5 mm.

The initial tension given to the fiber bundle was set to 150 g, and the fiber bundle was fed at the feeding speed of 5 m/min. The flow velocity of the suction airflow in the spread region (in an open state without the fiber bundle) was 20 m/second, and the hot air temperature blown out of the heating mechanism was set to 100° C. The vertical vibration-giving mechanism has the vibration rate of 600 rpm, and the stroke amount of the pressing roll was set to 10 mm. The diameter of the pressing roll was 10 mm, and the pearskin finish was applied to the surface.

After setting as above, the fiber bundle was fed, and the spread fiber sheet was continuously formed. The spread fiber sheet has the fibers uniformly distributed with no gap generated, and the weight was approximately 30 g/m².

In order to check the continuity of fiber-spreading, the spread width and the thickness were measured at 10 spots every 1 m. The spread width was in a range of 25 to 27 mm, and the average spread width was approximately 26.5 mm. The variation was −5.7% to 1.9% to the average spread width. The thickness was in a range of 0.028 to 0.038 mm, and the average thickness was 0.034 mm. The variation was −0.006 to 0.004 mm to the average thickness.

Example 2

In the device illustrated in FIGS. 11 and 12, a device configuration in which two spread portions were arranged, the vertical vibration-giving mechanism was installed in the downstream-side spread portion, and the heating mechanism 61 illustrated in FIG. 14 was put into practice. As the fiber bundle, a carbon fiber (by Mitsubishi Rayon Co., Ltd., PYROFIL TR50S-15K: fiber diameter of approximately 7 μm and the number of fibers of 15000) was used. The original width $W_0$ of the fiber bundle was approximately 6 mm.

The spread width $W_1$ of the fiber-spreading region $A_1$ was set to 25 mm, the spread width $W_2$ of the fiber-spreading region $A_2$ was set to 48 mm, the length $L_2$ of the expansion region $B_2$ in the feeding direction was set to 30 mm, and the expansion angle θ was set to approximately 21°. The length of each fiber-spreading region between the guide rolls was 20 mm, and the diameter of the guide roll was 6 mm, and the pearskin finish was applied to the surface. The diameter of the bend ensuring roll was 10 mm, and the pearskin finish was applied to the surface. The bend ensuring roll was positioned and set below the guide rolls by 5 mm.

The initial tension given to the fiber bundle was set to 150 g, and the fiber bundle was fed at the feeding speed of 5 m/min. The flow velocity of the suction airflow in the spread region (in an open state without the fiber bundle) was 20 m/second, and the hot air temperature blown out of the heating mechanism was set to 100° C. The vertical vibration-giving mechanism has the vibration rate of 600 rpm, and the stroke amount of the pressing roll was set to 10 mm. The diameter of the pressing roll was 10 mm, and the pearskin finish was applied to the surface.

After setting as above, the fiber bundle was fed, and the spread fiber sheet was continuously formed. The spread fiber sheet has the fibers uniformly distributed with no gap generated, and the weight was approximately 21 g/m².

In order to check the continuity of fiber-spreading, the spread width and the thickness were measured at 10 spots every 1 m. The spread width was in a range of 44 to 48 mm, and the average spread width was approximately 46.6 mm. The variation was −5.6% to 3.0% to the average spread width. The thickness was in a range of 0.020 to 0.028 mm, and the average thickness was 0.023 mm. The variation was −0.003 to 0.005 mm to the average thickness.

Example 3

The same device configuration and the same carbon fiber bundle as in Example 2 were used.

The spread width $W_1$ of the fiber-spreading region $A_1$ and the spread width $W_2$ of the fiber-spreading region $A_2$ were set the same as those in Example 2. The length $L_2$ of the expansion region $B_2$ in the feeding direction was set to 20 mm, and the expansion angle θ was set to approximately 30°. The length of each fiber-spreading region between the guide rolls, the diameter of the guide roll and the surface treatment, the diameter of the bend ensuring roll and the surface treatment, and the position of the bend ensuring roll were set the same as those in Example 2.

The initial tension, given to the fiber bundle, the feeding speed of the fiber bundle, the flow velocity of the suction airflow in the spread region, the hot air temperature from the heating mechanism, the vibration rate of the vertical vibration-giving mechanism and the diameter of the pressing roll, the surface treatment and the stroke amount were set the same as those in Example 2.

After setting as above, the fiber bundle was fed, and the spread fiber sheet was continuously formed. The spread fiber sheet has the fibers uniformly distributed with no gap generated, and the weight was approximately 21 g/m². In the case of the expansion angle θ of 30°, too, a spread fiber sheet excellent in fiber distribution can be obtained.

In order to check the continuity of fiber-spreading, the spread width and the thickness were measured at 10 spots every 1 m. The spread width was in a range of 42 to 48 mm, and the average spread width was approximately 45.7 mm. The variation was −8.1% to 5.0% to the average spread width. The thickness was in a range of 0.019 to 0.029 mm, and the average thickness was 0.024 mm. The variation was −0.005 to 0.005 mm to the average thickness.

Example 4

In the device illustrated in FIG. 1, a device configuration in which two spread portions were arranged, and the heating mechanism 61 illustrated in FIG. 14 was put into practice. As the fiber bundle, a carbon fiber (by Mitsubishi Rayon Co., Ltd., PYROFIL TR50S-15K: fiber diameter of approximately 7 μm and the number of fibers of 15000) was used. The original width $W_0$ of the fiber bundle was approximately 6 mm.

The spread width $W_1$ of the fiber-spreading region $A_1$ was set to 20 mm, the spread width $W_2$ of the fiber-spreading region $A_2$ was set to 40 mm, the length $L_2$ of the expansion region $B_2$ in the feeding direction was set to 50 mm, and the expansion angle θ was set to approximately 11°. The length of each fiber-spreading region between the guide rolls was 20 mm, and the diameter of the guide roll was 6 mm, and the pearskin finish was applied to the surface.

The initial tension given to the fiber bundle was set to 100 g, and the fiber bundle was fed at the feeding speed of 3 m/min. The flow velocity of the suction airflow in the spread region (in an open state without the fiber bundle) was 30 m/second, and the hot air temperature blown out of the heating mechanism was set to 100° C.

After setting as above, the fiber bundle was fed, and the spread fiber sheet was continuously formed. The spread fiber sheet has the fibers uniformly distributed with no gap generated, and the weight was approximately 26 g/m².

In order to check the continuity of fiber-spreading, the spread width and the thickness were measured at 10 spots every 1 m. The spread width was in a range of 36 to 40 mm, and the average spread width was approximately 37.8 mm. The variation was −4.8% to 5.8% to the average spread width. The thickness was in a range of 0.024 to 0.031 mm, and the average thickness was 0.028 mm. The variation was −0.004 to 0.003 mm to the average thickness.

Example 5

In the device illustrated in FIGS. 9 and 10, a device configuration in which two spread portions were arranged, the vertical vibration-giving mechanism was installed in the downstream-side spread portion, and the heating mechanism 61 illustrated in FIG. 14 was put into practice. As the fiber bundle, a carbon fiber (by Toray Industries Inc., Torayca T700SC-24K: fiber diameter of approximately 7 μm and the number of fibers of 24000) was used. The original width $W_0$ of the fiber bundle was approximately 12 mm.

The spread width $W_1$ of the fiber-spreading region $A_1$ was set to 25 mm, the spread width $W_2$ of the fiber-spreading region $A_2$ was set to 45 mm, the length $L_2$ of the expansion region $B_2$ in the feeding direction was set to 50 mm, and the expansion angle θ was set to approximately 11°. The length of each fiber-spreading region between the guide rolls was 20 mm, and the diameter of the guide roll was 6 mm, and the pearskin finish was applied to the surface. The diameter of the bend ensuring roll was 10 mm, and the pearskin finish was applied to the surface. The bend ensuring roll was positioned and set below the guide rolls by 5 mm.

The initial tension given to the fiber bundle was set to 200 g, and the fiber bundle was fed at the feeding speed of 5 m/min. The flow velocity of the suction airflow in the spread region (in an open state without the fiber bundle) was 20 m/second, and the hot air temperature blown out of the heating mechanism was set to 100° C. The vertical vibration-giving mechanism has the vibration rate of 600 rpm, and the stroke amount of the pressing roll was set to 10 mm. The diameter of the pressing roll was 10 mm, and the pearskin finish was applied to the surface.

After setting as above, the fiber bundle was fed, and the spread fiber sheet was continuously formed. The spread fiber sheet has the fibers uniformly distributed with no gap generated, and the weight was approximately 37 g/m².

In order to check the continuity of fiber-spreading, the spread width and the thickness were measured at 10 spots every 1 m. The spread width was in a range of 40 to 45 mm, and the average spread width was approximately 42.9 mm. The variation was −6.8% to 4.9% to the average spread width. The thickness was in a range of 0.034 to 0.046 mm, and the average thickness was 0.041 mm. The variation was −0.007 to 0.005 mm to the average thickness.

Example 6

In the device illustrated in FIGS. 11 and 12, a device configuration in which three spread portions were arranged, the vertical vibration-giving mechanism was installed in the lowermost stream side spread portion, and the heating mechanism 61 illustrated in FIG. 14 was put into practice. As the fiber bundle, a carbon fiber (by Toray Industries Inc., Torayca T700SC-24K: fiber diameter of approximately 7 μm and the number of fibers of 24000) was used. The original width $W_0$ of the fiber bundle was approximately 12 mm.

The spread width $W_1$ of the fiber-spreading region $A_1$ was set to 25 mm, the spread width $W_2$ of the fiber-spreading region $A_2$ was set to 45 mm, the spread width $W_3$ of the fiber-spreading region $A_3$ was set to 65 mm, the length $L_2$ of the expansion region $B_2$ in the feeding direction was set to 50 mm (the expansion angle θ was set to approximately 11°), and the length $L_3$ of the expansion region $B_3$ in the feeding direction was set to 50 mm (the expansion angle θ was set to approximately 11°). The length of each fiber-spreading region between the guide rolls was 20 mm, and the diameter of the guide roll was 6 mm, and the pearskin finish was applied to the surface. The diameter of the bend ensuring roll was 10 mm, and the pearskin finish was applied to the surface. The bend ensuring roll was positioned and set below the guide rolls by 5 mm.

The initial tension given to the fiber bundle was set to 200 g, and the fiber bundle was fed at the feeding speed of 7 m/min. The flow velocity of the suction airflow in the spread region (in an open state without the fiber bundle) was 20 m/second, and the hot air temperature blown out of the heating mechanism was set to 100° C. The vertical vibration-giving mechanism has the vibration rate of 800 rpm, and the stroke amount of the pressing roll was set to 10 mm. The diameter of the pressing roll was 10 mm, and the pearskin finish was applied to the surface.

After setting as above, the fiber bundle was fed, and the spread fiber sheet was continuously formed. The spread fiber sheet has the fibers uniformly distributed with no gap generated, and the weight was approximately 25 g/m².

In order to check the continuity of fiber-spreading, the spread width and the thickness were measured at 10 spots every 1 m. The spread width was in a range of 58 to 65 mm, and the average spread width was approximately 62.3 mm. The variation was −6.9% to 4.3% to the average spread width. The thickness was in a range of 0.023 to 0.034 mm, and the average thickness was 0.027 mm. The variation was −0.004 to 0.006 mm to the average thickness.

Example 7

In the device illustrated in FIGS. 11 and 12, a device configuration in which two spread portions were arranged, the vertical vibration-giving mechanism was installed in the downstream-side spread portion, and the heating mechanism 61 illustrated in FIG. 14 was put into practice. As the fiber bundle, a carbon fiber (by Glafill Co., Ltd., Type 50-60K: fiber diameter of approximately 7 μm and the number of fibers of 60000) was used. The original width $W_0$ of the fiber bundle was approximately 14 mm.

The spread width $W_1$ of the fiber-spreading region $A_1$ was set to 30 mm, the spread width $W_2$ of the fiber-spreading region $A_2$ was set to 50 mm, the length $L_2$ of the expansion region $B_2$ in the feeding direction was set to 50 mm, and the expansion angle θ was set to approximately 11°. The length of each fiber-spreading region between the guide rolls was 20 mm, and the diameter of the guide roll was 6 mm, and the pearskin finish was applied to the surface. The diameter of the bend ensuring roll was 10 mm, and the pearskin finish was applied to the surface. The bend ensuring roll was positioned and set below the guide rolls by 5 mm.

The initial tension given to the fiber bundle was set to 400 g, and the fiber bundle was fed at the feeding speed of 5 m/min. The flow velocity of the suction airflow in the spread region (in an open state without the fiber bundle) was 20 m/second, and the hot air temperature blown out of the heating mechanism was set to 100° C. The vertical vibration-giving mechanism has the vibration rate of 600 rpm, and the stroke amount of the pressing roll was set to 10 mm. The diameter of the pressing roll was 10 mm, and the pearskin finish was applied to the surface.

After setting as above, the fiber bundle was fed, and the spread fiber sheet was continuously formed. The spread fiber sheet has the fibers uniformly distributed with no gap generated, and the weight was approximately 83 g/m².

In order to check the continuity of fiber-spreading, the spread width and the thickness were measured at 10 spots every 1 m. The spread width was in a range of 44 to 50 mm, and the average spread width was approximately 47.8 mm. The variation was −7.9% to 4.6% to the average spread width. The thickness was in a range of 0.081 to 0.102 mm, and the average thickness was 0.089 mm. The variation was −0.009 to 0.013 mm to the average thickness.

Example 8

In the device illustrated in FIG. 20, a device configuration in which two spread portions were arranged, and the vertical vibration-giving mechanism was installed in the downstream-side spread portion was put into practice. As the fiber bundle, a carbon fiber (by Mitsubishi Rayon Co., Ltd., PYROFIL TR50S-15K: fiber diameter of approximately 7 μm and the number of fibers of 15000) was used. The original width $W_0$ of the fiber bundle was approximately 6 mm. The number of fiber bundles was 7, and the interval between the fiber bundles was set to 48 mm.

The spread width $W_1$ of the fiber-spreading region $A_1$ was set to 24 mm, the spread width $W_2$ of the fiber-spreading region $A_2$ was set to 48 mm, the length $L_2$ of the expansion region $B_2$ in the feeding direction was set to 50 mm, and the expansion angle θ was set to approximately 13°. The length of each fiber-spreading region between the guide rolls was 20 mm, and the diameter of the guide roll was 10 mm, and the pearskin finish was applied to the surface. The diameter of the bend ensuring roll was 10 mm, and the pearskin finish was applied to the surface. The bend ensuring roll was positioned and set below the guide rolls by 5 mm.

The initial tension given to the fiber bundle was set to 150 g, and the fiber bundle was fed at the feeding speed of 10 m/min. The flow velocity of the suction airflow in the spread region (in an open state without the fiber bundle) was 20 m/second, and the hot air temperature blown out of the heating mechanism was set to 100° C. The vertical vibration-giving mechanism has the vibration rate of 950 rpm, and the stroke amount of the pressing roll was set to 10 mm. The width-direction vibration giving mechanism has the vibration rate of 450 rpm and the stroke amount of the bow bar was set to 5 mm. The diameter of the pressing roll was 10 mm, the diameter of the bow bar was 25 mm, and the pearskin finish was applied to the respective surfaces.

After setting as above, the fiber bundle was fed, and the spread fiber sheet having the sheet width of approximately 340 mm was continuously formed. The spread fiber sheet has the fibers uniformly distributed with no gap generated, and the weight was approximately 21 g/m².

In order to check the continuity of fiber-spreading, one of the seven spread fiber sheets was taken out, and the spread width and the thickness were measured at 10 spots every 1 m. The spread width was in a range of 46 to 50 mm, and the average spread width was approximately 48.3 mm. The variation was −4.8% to 3.5% to the average spread width. The thickness was in a range of 0.018 to 0.027 mm, and the average thickness was 0.023 mm. The variation was −0.005 to 0.004 mm to the average thickness.

Example 9

In the device illustrated in FIG. 21, a device configuration in which two spread portions were arranged, and the vertical vibration-giving mechanism was installed in the downstream-side spread portion. As the fiber bundle, a carbon fiber (by Mitsubishi Rayon Co., Ltd., PYROFIL TR50S-15K: fiber diameter of approximately 7 μm and the number of fibers of 15000) was used. The original width $W_0$ of the fiber bundle was approximately 6 mm. The number of fiber bundles was seven, and the interval between the fiber bundles was set to 48 mm. Also, for resin-adhering release sheet, a sheet in which an application amount of 20 g/m² of an epoxy resin was applied with the width of 350 mm on release paper (by Lintec Corporation) having the weight of 120 g/m² and the width of 400 mm was used. For the release paper sheet, release paper (by Lintec Corporation) having the weight of 120 g/m² was used.

The settings of the fiber-spreading region, the expansion region, each guide roll, and each bend ensuring roll were made the same as in Example 8. The feeding speed of the fiber bundle was set to 5 m/minutes, and the vibration rate of the vertical vibration-giving mechanism was set to 550 rpm, and the vibration rate of the width-direction vibration giving mechanism was set to 300 rpm. The initial tension applied to the fiber bundle, the flow velocity of the suction airflow in the spread region, the hot air temperature blown out of the heating mechanism, the diameter of the pressing roll of the vertical vibration-giving mechanism, the surface treatment and the stroke amount, the bow-bar diameter of the width-direction vibration giving mechanism, the surface treatment and the stroke amount were set the same as in Example 8.

Seven fiber bundles were spread under the same conditions as in Example 8, the spread fiber sheet having the width of approximately 340 mm and excellent in fiber distribution was formed, and the spread fiber sheet was continuously held between the resin-adhering release sheet and the release sheet and fed.

The temperatures of the heating and pressurizing roll and the heating plate were set to 120° C. and the cooling roll and the cooling plate were water-cooled, and the line pressure of the heating and pressurizing roll was set to 15 kgf/cm and the line pressure of the cooling roll was set to 5 kgf/cm. After being discharged from the cooling roll, only the release sheet on the upper side was taken up, and the fiber-reinforced sheet, which is a product, was taken up with the release sheet of the resin-adhering release sheet.

With the above settings, the fiber-reinforced sheet called pre-preg sheet impregnated with the epoxy resin was continuously formed. The fiber-reinforced sheet was formed having the sheet width of 340 mm, the fibers uniformly distributed, and the thickness substantially uniform.

Example 10

In the device illustrated in FIG. 22, a device configuration in which two spread portions were arranged, the vertical vibration-giving mechanism was installed in the downstream-side spread portion, a mechanism which continuously supplies a thermoplastic resin film instead of the resin push-out mechanism, and a series of a pair of heating and pressurizing rolls and a series of a pair of cooling rolls are installed was put into practice. As the fiber bundle, a carbon fiber (by Mitsubishi Rayon Co., Ltd., PYROFIL TR50S-15K: fiber diameter of approximately 7 μm and the number of fibers of 15000) was used. The original width $W_0$ of the fiber bundle was approximately 6 mm. The number of fiber bundles was seven, and the interval between the fiber bundles was set to 48 mm. Also, for the thermoplastic resin film, a polyetherpolyimidd film (by Mitsubishi Plastics Inc.) having the thickness of 15 μm and the width of 350 mm was used. A thermosetting polyimide resin film having the width of 400 mm (product name: Upilex S, thickness: 25 μm, by Ube Industries Ltd.) was supplied as a release sheet.

The settings of the fiber-spreading region, the expansion region, each guide roll, and each bend ensuring roll were made the same as in Example 9. The feeding speed of the fiber bundle was set to 10 m/minutes, and the vibration rate of the vertical vibration-giving mechanism was set to 950 rpm, and the vibration rate of the width-direction vibration giving mechanism was set to 450 rpm. The initial tension applied to the fiber bundle, the flow velocity of the suction airflow in the spread region, the hot air temperature blown out of the heating mechanism, the diameter of the pressing roll of the vertical vibration-giving mechanism, the surface treatment and the stroke amount, the bow-bar diameter of the width-direction vibration giving mechanism, the surface treatment and the stroke amount were set the same as in Example 9.

Seven fiber bundles were spread under the same conditions as in Example 9, the spread fiber sheet having the width of approximately 340 mm and excellent in fiber distribution was formed, and the spread fiber sheet was continuously held between the resin-adhering release sheet and the release sheet and supplied to the heating and pressurizing roll.

The temperature of the heating and pressurizing roll was set to 340° C. and the cooling roll was water-cooled, and the line pressure of the heating and pressurizing roll was set to 5 kgf/cm. After being discharged from the cooling roll, the release sheets on the both sides were taken up, and the fiber-reinforced sheet, which is a product, was taken up.

With the above settings, the fiber-reinforced sheet to which the spread fiber sheet and the polyetherimide resin film continuously adheres continuously was formed. The fiber-reinforced sheet was formed having the sheet width of 340 mm, the fibers uniformly distributed.

Comparative Example

The same device configuration and the same carbon fiber bundle as in Example 2 were used.

The spread width $W_1$ of the fiber-spreading region $A_1$ and the spread width $W_2$ of the fiber-spreading region $A_2$ were set the same as in Example 2 and the spread width $W_1$ of the fiber-spreading region $A_1$ was set to 25 mm and the spread width $W_2$ of the fiber-spreading region $A_2$ was set to 48 mm. The length $L_2$ of the expansion region $B_2$ in the feeding direction was set to 15 mm, and the expansion angle θ was set to approximately 37°. The length of each fiber-spreading region between the guide rolls, the diameter of the guide roll and the surface treatment, the diameter of the bend ensuring roll and the surface treatment, and the position of the bend ensuring roll were set the same as in Example 2.

The initial tension applied to the fiber bundle, the feeding speed of the fiber bundle, the flow velocity of the suction airflow in the spread region, the hot air temperature from the heating mechanism, the number of vibrations and the diameter of the pressing roll of the vertical vibration-giving mechanism, the surface treatment and the stroke amount were set the same as in Example 2.

With the above settings, the fiber bundle was fed, and the spread fiber sheet was formed. The spread fiber sheet had poor fiber distribution and had a portion in which fiber density is varied, and there were some portions in which gaps are generated in the fibers.

REFERENCE SIGNS LIST

A fiber-spreading region
B expansion region
S region set
Tm fiber bundle
Ts spread fiber sheet
Rs release sheet
JRs resin-adhering release sheet
Js resin sheet
Ps fiber-reinforced sheet
11 yarn supplier
12 yarn supply motor
21 guide roll
22 feed roll
23 support roll
24 feed motor
25 support roll
26 tension-giving roll
27 upper-limit position detection sensor
28 lower-limit position detection sensor
29 nip roll
31 guide roll
32 cavity tube
33 flow control valve
34 air intake pipe
35 guide member
36 bend ensuring roll
41 take-up roll
42 take-up motor
51 support roll
52 elevation rod
53 pressing roll
54 crank arm 55 crank motor
61 heating mechanism
71 contact roll
72 support roll
81 bow bar
82 support roll
83 crank motor
84 crank mechanism
201 support roll
202 tension roll
203 spring member
204 guide roll
205 alignment roll
901 release sheet supply mechanism
902 resin-adhering release sheet supply mechanism
903 release sheet take-up mechanism
904 product take-up mechanism
905 heating and pressurizing roll
906 cooling roll
907 heating plate
908 cooling plate
909 reverse roll
910 resin push-out mechanism

The invention claimed is:

1. A method for spreading fiber bundles, comprising the steps of feeding a fiber bundle formed of a plurality of fibers in a fiber length direction and moving the fibers in a width direction while bending the fibers by letting a fluid pass through the fiber bundle in a movable region set so that the fibers can move in the width direction, thereby spreading the fiber bundle,
   wherein in the movable region, a set of regions $S_i$ (i=1, ..., n) each including a pair of a fiber-spreading region $A_i$ (i=1, ..., n) and an expansion region $B_i$ (i=1, ..., n) are arranged in a feeding direction of the fiber bundle in a number of n (n≥2), the fiber-spreading region $A_i$ moving the fibers in the width direction while bending the fibers by letting a fluid pass through the fiber bundle, thereby spreading the fiber bundle to a spread width $W_i$,
   wherein the expansion region $B_i$, which is set on the upstream side in the feeding direction corresponding to the fiber-spreading region $A_i$ and in which the width of the fiber bundle expands toward the end with movement of the fibers in the width direction in the fiber-spreading region $A_i$, has a length $L_i$ in the feeding direction;
   wherein in the region sets Sj j=2, ..., n), a spread width Wj−1 of the fiber-spreading region Aj−1, a spread width Wj of the fiber-spreading region Aj, and a length Lj of the fiber bundle in the feeding direction in the expansion region Bj are set to satisfy:

$0<(Wj-Wj-1)/2Lj \leq \tan 30°$, and wherein the fiber bundle is spread by being fed so as to sequentially pass through the region set $S_i$.

2. The method for spreading fiber bundles according to claim 1, wherein
   in the first region set $S_i$, the spread width $W_i$ of the fiber bundle in the fiber-spreading region $A_1$ is set to satisfy with respect to an original width $W_0$ of the fiber bundle:

$1<(W_1/W_0) \leq 5$.

3. The method for spreading fiber bundles according to claim 2, wherein
   the spread width $W_1$ of the fiber bundle in the fiber-spreading region $A_1$ is set to satisfy:

$2 \leq (W_1/W_0) \leq 4$.

4. The method for spreading fiber bundles according to claim 1, wherein
   at least in a part of the fiber-spreading regions, a fluid is passed through the fiber bundles in a plurality of sections so that the fibers are moved in the width direction while being bent.

5. The method for spreading fiber bundles according to claim 1, wherein
   at least in a part of the expansion regions, at least one or more contact rolls arranged in the width direction and in contact with the fiber bundle is disposed; and
   the fiber bundle is fed in contact with the contact roll.

6. The method for spreading fiber bundles according to claim 5, wherein
   the contact roll reciprocates in the width direction of the fiber bundle.

7. The method for spreading fiber bundles according to claim 1, wherein
   at least in a part of the expansion regions and/or the fiber-spreading regions, the fiber bundle is heated.

8. The method for spreading fiber bundles according to claim 1, wherein
   at least in a part of the fiber-spreading regions, a degree by which the fiber bundle is bent is temporally changed.

9. The method for spreading fiber bundles according to claim 8, wherein
   at least in a part of the fiber-spreading regions, spreading is performed while a predetermined degree by which the fiber bundle is bent is ensured by a bend ensuring roll for the fiber bundle.

10. The method for spreading fiber bundles according to claim 9, wherein
    by means of at least one roll in the bend ensuring rolls, the fiber bundle is vibrated in a direction orthogonal to the feeding direction.

11. The method for spreading fiber bundles according to claim 1, wherein
    on the upstream side of the movable region, the fiber bundle is fed while pullback of the fiber bundle is prevented.

12. The method for spreading fiber bundles according to claim 1, wherein
    vibration is given in the width direction to a spread fiber sheet obtained by spreading the fiber bundle.

13. The method for spreading fiber bundles according to claim 1, wherein
    a plurality of the fiber bundles is spread at the same time while being fed.

14. The method for spreading fiber bundles according to claim 13, wherein
    vibration in the width direction is given to the plurality of spread fiber sheets obtained by spreading a plurality of the fiber bundles arranged in parallel so as to form an entirely uniform sheet state.

15. A method for manufacturing a fiber-reinforced sheet, wherein
    a resin layer is formed on one side or both sides of a spread fiber sheet obtained by a method for spreading fiber bundles in claim 1 so as to form the fiber-reinforced sheet.

16. The method for manufacturing a fiber-reinforced sheet according to claim 15, wherein
    the resin layer is formed by using a resin sheet.

17. A method for manufacturing a fiber-reinforced sheet, wherein a fiber-reinforced sheet is manufactured by causing a spread fiber sheet obtained by a method for spreading fiber bundles in claim 1 to adhere to both faces of a resin sheet.

18. A method for manufacturing a fiber-reinforced sheet, wherein the fiber-reinforced sheet is manufactured by impregnating a spread fiber sheet obtained by a method for spreading fiber bundles in claim 1 with a resin material.

* * * * *